US006996699B2

(12) United States Patent
Chrysanthakopoulos et al.

(10) Patent No.: US 6,996,699 B2
(45) Date of Patent: Feb. 7, 2006

(54) SECONDARY PROCESSOR EXECUTION KERNEL FRAMEWORK

(75) Inventors: Georgios Chrysanthakopoulos, Redmond, WA (US); Brian L. Schmidt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 638 days.

(21) Appl. No.: 10/241,777

(22) Filed: Sep. 10, 2002

(65) Prior Publication Data

US 2004/0049654 A1 Mar. 11, 2004

(51) Int. Cl.
*G06F 15/00* (2006.01)
(52) U.S. Cl. .................. 712/35; 718/108; 718/100; 719/328; 719/330; 717/162
(58) Field of Classification Search .................. 712/32, 712/34, 35, 40; 718/1, 100, 102, 104, 108; 719/310, 312, 322–328, 330–332; 717/162; 710/131, 220, 260; 711/150; 345/501–503
See application file for complete search history.

(56) References Cited

U.S. PATENT DOCUMENTS

| 5,440,740 | A | * | 8/1995 | Chen et al. | 718/104 |
| 5,539,896 | A | * | 7/1996 | Lisle | 711/150 |
| 5,727,211 | A | * | 3/1998 | Gulsen | 718/108 |
| 5,771,232 | A | * | 6/1998 | Sinibaldi et al. | 370/384 |
| 5,968,158 | A | * | 10/1999 | Andrews et al. | 710/260 |
| 6,029,000 | A | * | 2/2000 | Woolsey et al. | 717/147 |
| 6,173,358 | B1 | | 1/2001 | Combs | 711/100 |
| 6,233,643 | B1 | * | 5/2001 | Andrews et al. | 710/316 |
| 6,338,130 | B1 | * | 1/2002 | Sinibaldi et al. | 712/35 |
| 6,549,945 | B1 | * | 4/2003 | Sinibaldi et al. | 709/226 |
| 2001/0049753 | A1 | * | 12/2001 | Gary | 709/330 |
| 2002/0178313 | A1 | * | 11/2002 | Gary | 710/260 |

FOREIGN PATENT DOCUMENTS

WO    WO 99/35009    7/1999

OTHER PUBLICATIONS

Kettler-Katch-Strosnider, A Modeling Methodology for Real-Time/Multimedia Operating Systems, 1995, IEEE.*
Bindra, Ashok. 1997. "TI, Spectron team on API." 3 pp. Available http://www.eetimes.com/news/97/946news/texas.html.

(Continued)

*Primary Examiner*—Anthony Nguyen-Ba
(74) *Attorney, Agent, or Firm*—Ronald M. Anderson

(57) ABSTRACT

Preparing one or more secure media effect programs, generating a binary image of the programs and associated data, loading the binary image into memory of a secondary processor, and executing the programs of the binary image with the secondary processor, substantially independent from a primary processor. A binary image builder automatically maps one or more programs and data to secondary processor memory by changing encoded binary instructions of each program before execution by the secondary processor. The changes identify locations at which the programs and data will be stored in secondary processor memory, identify locations of parameters that can be updated in real time, and enable execution control to return to a secondary processor execution kernel. The secondary processor execution kernel polls flags in a main memory to determine whether to download new or updated state data and/or program code from main memory to the secondary processor memory.

23 Claims, 16 Drawing Sheets

OTHER PUBLICATIONS

Grant, Rick. 2000. Applied Technology; Lighthouse Digital Systems OZ TDM audio router. *Broadcast Engineering* (Jun.) 4pp. Available http://asp.nerac.com/caccess/WNDABSM?SESSION=D77697D3003C6332&ndn=102022813780&topic.

Keate, Liz. "Real-Time Operating System Simplifies DSP Multiprocessor Application Development." n.d.: 1265-71. Available http://www.icspat.com/papers/539mfi.pdf.

Sharma, Atul. 1998. Neelpros: A predictable real-time kernel layer design for multimedia. Ph.D. diss., Rutgers University (abstract-p. 27 only).

Srinivasan, Sadagopan et al. "Transparent Data-Memory Organizations for Digital Signal Processors." n.d.: pp 44-48. Available http://www.ece.umd.edu/blj/embedded.

Thompson, Bruce. "Emerging Markets—Enabling Technologies: Matching Algorithm/Resource." n.d.: 5 pp. Available http://www.eetimes.com/docs/spox.html.

Wells, Thomas. 2000. Sounds Logical Wavewarp 1.2 (Win). *Electronic Musician.* 16:6 (Jun.) 6 pp. Available http://asp.nerac.com/caccess/WNDABSM?SESSION=D77697D3003C6332&ndn=102022710321&topic.

"Employment at TI—United States: TI in Santa Barbara: Operating Excellence along the South Coast Gateway." n.d.: 2 pp. Available http://www.ti.com/recruit/docs/us/santabarbara.shtml.

News Release: "AT&T upgrades VCOS operating system for multimedia applications." Aug. 23, 1993. 2 pp. Available http://www.att.com/press/0893/930823.meb.html.

"Antares 2000/50, 3000/50, 6000/50 ISA Platform." n.d.: 5 pp. Available http://www.dialogic.com/products/d_sheets/1871web.htm.

"ICSPAT DSP World Expo: Tutorials and Workshops." n.d.: 3 pp. Available http://www.icspat.com/papers/panel.htm.

\* cited by examiner

SECONDARY PROCESSOR EXECUTION KERNEL FRAMEWORK

FIELD OF THE INVENTION

This invention generally relates to a secondary processor execution kernel, such as an execution kernel for a digital signal processor (DSP), and more particularly, to a framework for loading the secondary processor execution kernel, loading a secondary processor program and corresponding data with the secondary processor execution kernel, and executing the secondary processor program under control of the secondary processor execution kernel.

BACKGROUND OF THE INVENTION

Many electronic devices include both a primary and a secondary processor. The primary processor is typically used to perform core functions of the electronic device. The secondary processor performs other functions, such as media processing, math coprocessing, and other specialized functions, freeing the primary processor from such processing tasks. Typically, the functions are performed in real time by both processors to increase the overall processing speed of the electronic device. To further relieve the primary processor, it is preferable that the secondary processor perform its functions with little control by the primary processor. Thus, it is preferable for the secondary processor to load programs and data and to execute such programs independently of the primary processor. Enabling such capabilities requires a secondary processor control program to manage input/output (I/O) tasks, communication with the primary processor, and other overhead. This control program is sometimes referred to as an execution kernel.

Effectively, the execution kernel is a secondary operating system specifically for the secondary processor. Since the secondary processor is frequently a DSP that is used for real time functions, the execution kernel is often referred to as "a DSP execution kernel" or "a real time DSP operating system." A number of such real time DSP operating systems are currently available for general purpose DSPs, including the Visible Caching Operating System (VCOS™) by AT&T Corp., SPOX™, which was originally developed by Spectron Microsystems, Inc. (later acquired by Texas Instruments, Inc.), and MWAVE™ by International Business Machines, Inc.

The above-identified real time DSP operating systems are generally multitasking operating systems with some interrupt and memory management capabilities. However, such capabilities are achieved at the expense of throughput speed, because interrupt and memory management tasks are relatively high overhead tasks. These capabilities and their corresponding overhead accommodate branching and other non-sequential instructions and are often included in application programs, designed for and executed by the DSP under the control of the real time DSP operating system. As with any programming language, such non-sequential instructions provide DSP application program developers with flexibility and high level programming capability. Requiring developers to employ only sequential programs could reduce or eliminate at least some of the corresponding overhead. However, use of only sequential programs would limit the desired flexibility, are difficult to write, and would not necessarily avoid the need for memory management overhead. To reduce overhead without sacrificing flexibility, many techniques used by conventional compilers and assemblers may be adopted or adapted for DSPs. Compiled or assembled DSP application programs can interface with the real time DSP operating system so as to reduce overhead tasks. However, compilers and assemblers have not eliminated the interrupt handling, memory management, and other overhead that must be performed by a real time DSP operating system.

To improve processing efficiency of a secondary processor such as a DSP, it would be preferable to minimize or eliminate the need for overhead processing functions in the secondary processor's real time operating system, without sacrificing functionality of application programs, without overburdening the application programmer, and without pushing overhead processing up to the primary processor. For example, it would be desirable to minimize or eliminate the need for interrupt handling, without sacrificing an ability to modify DSP application program values during run time. Similarly, it would be desirable to minimize or eliminate memory management functions, without requiring the DSP application programmer to predefine a memory map, and without pushing the memory management functions up to the primary processor.

Conventional compiler, assembler, and linking techniques are inadequate to achieve these desirable capabilities, because they assume that many interrupt handling, memory management, and other overhead processing functions are available through the real time operating system. However, the overhead processing functions cannot be eliminated from the real time operating system without pushing these functions back to the primary processor, to the compiler, to the assembler, to the linker, or to the programmer. It is clearly undesirable to impose a great deal of rigid design requirements on the programmer. Thus, no single aspect can be changed to achieve the desired efficiencies. Instead, a hybrid of minimal programming guidelines, automatic compile time memory mapping, and a minimal DSP execution kernel is warranted.

SUMMARY OF THE INVENTION

The present invention provides a method and system for loading and executing a binary image of data and program code into a secondary processor memory, without using a secondary processor to determine memory locations for the data and the program code. Instead, an efficient secondary processor execution kernel works independently from, but in some coordination with a subsystem that runs on the primary processor. Initially, a portion of a main memory is preallocated. This preallocated portion is sometimes referred to herein as the scratch space. The scratch space is mapped to the secondary processor memory and the scratch space is accessible by the secondary processor. A kernel location is predefined within the scratch space to store the secondary processor execution kernel. Preferably, the subsystem loads the secondary processor execution kernel into the scratch space at the kernel location, and initiates a boot routine of the secondary processor. The boot routine is hard coded to download anything at the predefined kernel location in the scratch space of the main memory. Thus, the secondary processor execution kernel is downloaded from the scratch space to a predefined kernel location in the secondary processor memory that corresponds to the predefined kernel location in the scratch space of the main memory.

In a similar fashion, an image location is predefined in the scratch space of the main memory. The subsystem loads the binary image into the scratch space at the image location. Preferably, the binary image is encoded to protect individual programs in the binary image and/or the entire binary image.

The subsystem decodes the binary image in the scratch space. A command flag is then set, indicating that data and/or program code are available to be downloaded to the secondary processor memory. The command flag is set at a predefined flag location within the scratch space of the main memory, so that the secondary processor can poll the predefined flag location and determine whether the command flag is set. If the command flag is set, the data and/or program code in the binary image is copied from the scratch space of the main memory into the secondary processor memory. Preferably, the data portion of the binary image is copied to a data memory subdivision of the secondary processor memory. Similarly, the program code of the binary image is preferably copied to a program memory subdivision of the secondary processor memory. Because the binary image is predefined by a binary image builder to replicate the secondary processor memory, the secondary processor need not determine locations in the secondary processor memory to store the binary image. Once the binary image is loaded into the secondary processor memory, the secondary processor can execute the programs of the binary image without further intervention from the secondary processor execution kernel.

Another aspect of the invention includes updating parameter values of the programs or other portions of the binary image while the programs are being executed by the secondary processor. The parameter values are included in the state data of the binary image. Because a copy of the binary image is stored in the scratch space of the main memory, a parameter value can be modified in the scratch space without having to interrupt the secondary processor. Instead, the location of the parameter value is determined in the scratch space of the main memory, and the parameter value is changed to an updated parameter value in the scratch space. The location of the parameter value is preferably available in a description header associated with the binary image. A state flag is then set at another predefined location in the scratch space. Similar to the command flag discussed above, this state flag location is also polled to detect a change in the status of the state flag. If the state flag is set, the updated parameter value is copied to a location in the secondary processor memory that corresponds to the parameter location within the scratch space of the main memory. Preferably, the state flag is polled and the updated parameter value is downloaded at intervals of execution frames, so that the secondary processor need not be interrupted. Thus, the updated parameter value is used in the next execution frame of the secondary processor. Executable program code can also be update in the above manner. Other aspects, features, and benefits of the invention will become apparent from the following description.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred embodiment of the present invention is described below in regard to an exemplary use in preparing audio effects on a personal computer and for performing the audio effects with a DSP on an electronic gaming system that is designed to execute gaming software distributed on a portable medium, such as a digital versatile disk (DVD). Those skilled in the art will recognize that the present invention may also be implemented in conjunction with a set-top box, an arcade game, a hand-held device, and other systems that utilize a secondary processor, such as a DSP. It should also be apparent that the present invention may be practiced on a single machine, such as a single PC, or practiced in a network environment, with multiple consoles or computing devices interconnected in peer-to-peer arrangement and/or with one or more server computers.

Exemplary Development Environment

Figure 1:
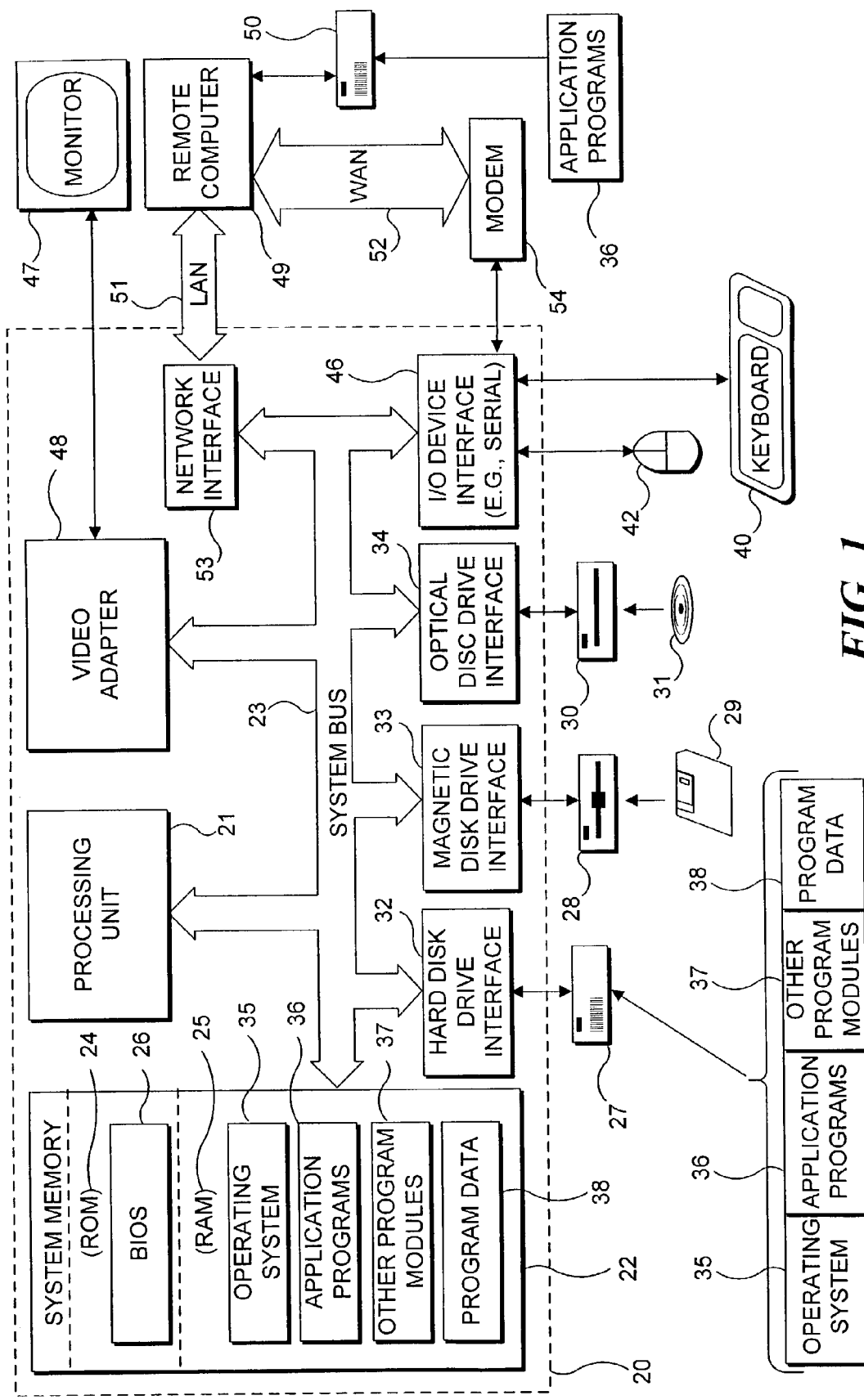
FIG. 1 is a functional block diagram of a general purpose computing device in the form of a conventional personal computer (PC) for use in an exemplary system.

FIG. 1 and the following discussion are intended to provide a brief, general description of a suitable computing environment in which software for the present invention may be developed. As indicated, the invention may be practiced on a single computing device, but can also be practiced on a development system and by one or more client computing devices. Both the client computing device and the development system may each include the functional components shown in FIG. 1. While it is possible for the present invention to be implemented on a general purpose personal computer, the client computing device preferably comprises a performance device, such as a gaming console as described below. Accordingly, the following discussion of a PC is primarily provided in regard to use of the PC for development of software used in the present invention.

Although not required, the present invention will be described in the general context of computer executable instructions, such as program modules, which are executed by a PC and/or a gaming console. Generally, program modules include application programs, such as computer simulations, routines, objects, components, functions, data structures, etc. that perform particular tasks or implement particular abstract data types. Also, those skilled in the art will appreciate that this invention may be practiced with other computer system configurations, particularly in distributed computing environments, where tasks are performed by remote processing devices that are linked through a communications network. In a distributed computing environment, program modules may be located in either or both local and remote memory storage devices.

With reference to FIG. 1, an exemplary system for use as a server computer, or a development system for developing software used in the present invention includes a general purpose computing device in the form of a conventional PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disc 29, and an optical disk drive 30 for reading from or writing to a removable optical disc 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disc 29, and removable optical disc 31, it will be appreciated by those skilled in the art that other types of computer readable media, which can store data that are accessible by a computer, such as magnetic cassettes, flash memory cards, DVDs, Bernoulli cartridges, RAMs, ROMs, and the like, may also be used in the exemplary operating environment.

A number of program modules may be stored on the hard disk, magnetic disc 29, optical disc 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated environment, and/or other information. In addition to the monitor, PCs are often coupled to other peripheral output devices (not shown), such as speakers (through a sound card or other audio interface (not shown)) and printers.

As indicated above, the invention may be developed and practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a game console, a peer device, a satellite, or other common network node. Remote computer 49 may include many or all of the elements described above in connection with PC 20, may include the elements described below in connection with a gaming console, or may include typical elements of other electronic devices that utilize a secondary media processor. So as not to make FIG. 1 unnecessarily complex, remote computer 49 is shown with only an external memory storage device 50. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Performance Environment

Figure 2:
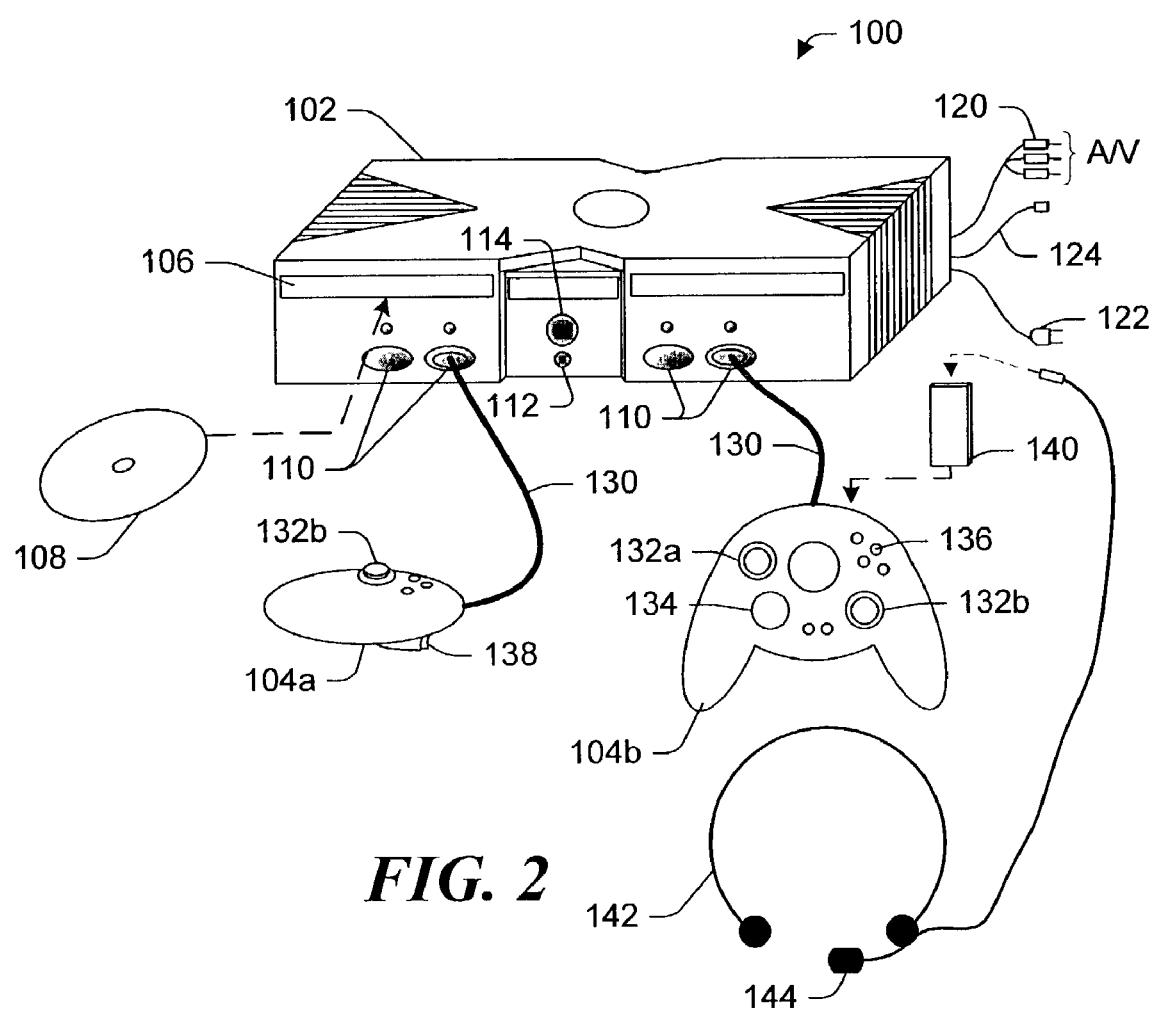
FIG. 2 is an isometric view of an exemplary electronic gaming system that includes a game console and support for up to four user input devices.

As shown in FIG. 2, an exemplary electronic gaming system 100 includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disc 108. Examples of suitable portable storage media include DVD discs and CD-ROM discs. In this gaming system, game programs are preferably distributed for use with the game console on DVD discs, but it is also contemplated that other storage media might instead be used on this or other types of systems that employ the present invention.

On a front face of game console 102 are four ports 110 for connection to supported controllers, although the number and arrangement of ports may be modified. A power button 112, and an eject button 114 are also disposed on the front face of game console 102. Power button 112 controls application of electrical power to the game console, and eject button 114 alternately opens and closes a tray (not shown) of portable media drive 106 to enable insertion and extraction of storage disc 108, so that the digital data on the disc can be read for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 includes an Ethernet data connector 124 to transfer and receive data over a network (e.g., through a peer-to-peer link to another game console or through a connection to a hub or a switch—not shown), or over the Internet, for example, through a connection to an xDSL interface, a cable modem, or other broadband interface (not shown). Other types of game consoles may be coupled together in communication using a conventional telephone modem.

Each controller 104a and 104b is coupled to game console 102 via a lead (or alternatively, through a wireless interface). In the illustrated implementation, the controllers are USB compatible and are connected to game console 102 via USB cables 130. Game console 102 may be equipped with any of a wide variety of user devices for interacting with and controlling the game software. As illustrated in FIG. 2, each controller 104a and 104b is equipped with two thumbsticks 132a and 132b, a D-pad 134, buttons 136, and two triggers 138. These controllers are merely representative, and other gaming input and control devices may be substituted for or added to those shown in FIG. 2 for use with game console 102.

A removable function unit 140 can optionally be inserted into controller 104 to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. In the described implementation, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from the MU. For example, gaming system 100 is capable of playing:

Game titles stored on CD and DVD discs, on the hard disk drive, or downloaded from an online source;

Digital music stored on a CD in portable media drive 106, in a file on the hard disk drive (e.g., Windows Media Audio™ (WMA) format), or derived from online streaming sources on the Internet or other network; and Digital AV data such as movies that are stored on a DVD disc in portable media drive 106, or in a file on the hard disk drive (e.g., in an Active Streaming Format), or from online streaming sources on the Internet or other network.

Figure 3:
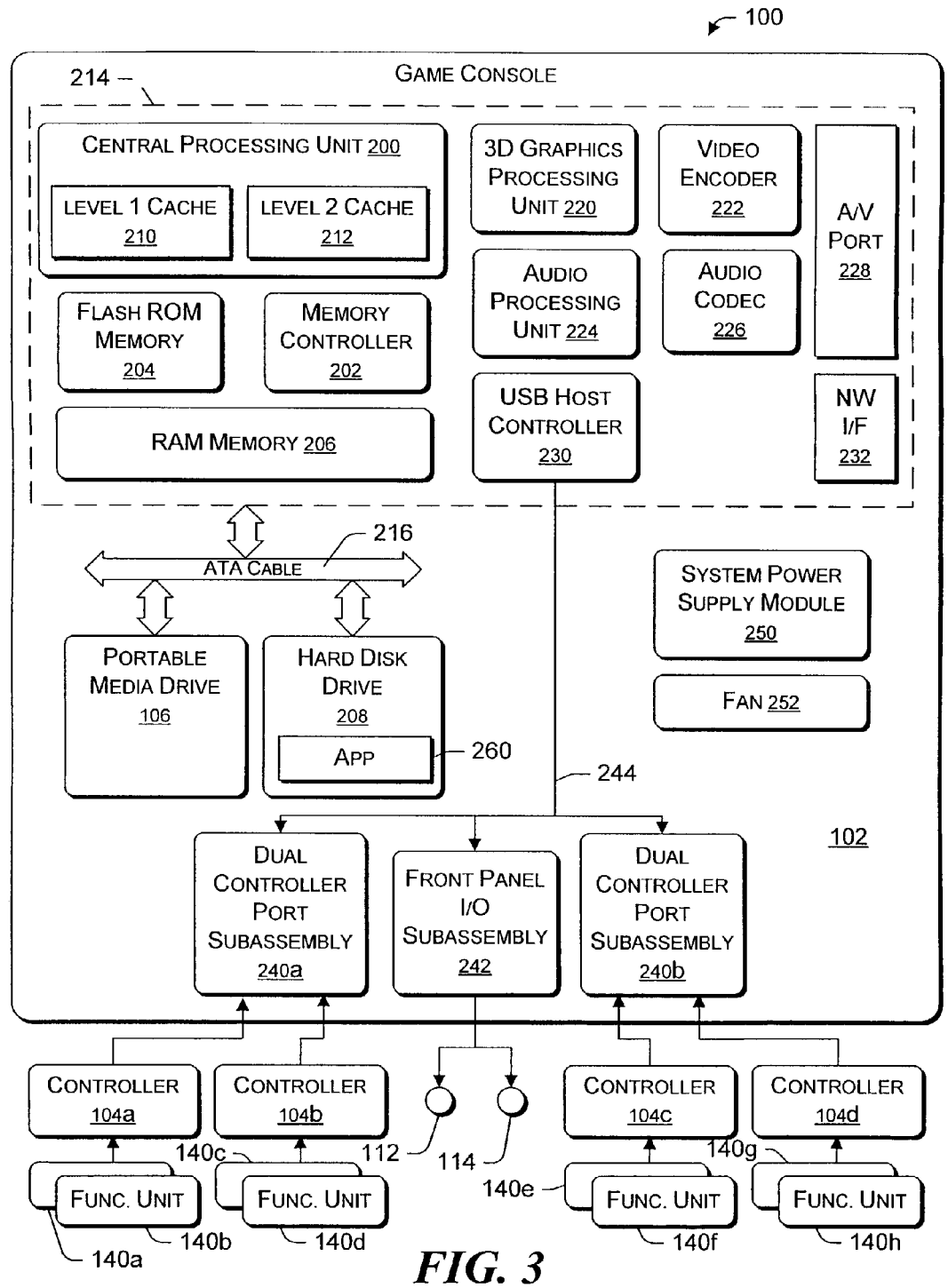
FIG. 3 is a functional block diagram showing functional components of the gaming system.

FIG. 3 shows functional components of gaming system 100 in greater detail. Game console 102 includes a central processing unit (CPU) 200, and a memory controller 202 that facilitate processor access to a read-only memory (ROM) 204, a random access memory (RAM) 206, a hard disk drive 208, and portable media drive 106. CPU 200 is equipped with a level 1 cache 210 and a level 2 cache 212 to temporarily store data so as to reduce the number of memory access cycles required, thereby improving processing speed and throughput. CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As an example of one suitable implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAMs (DDR SDRAMs) that are independently controlled by memory controller 202 via separate buses (not shown). Hard disk drive 208 and portable media drive 106 are connected to the memory controller via the PCI bus and an Advanced Technology Attachment (ATA) bus 216.

A three-dimensional (3D) graphics processing unit (GPU) 220 and a video encoder 222 form a video processing pipeline for high-speed and high-resolution graphics processing. Data are carried from graphics processing unit 220 to video encoder 222 via a digital video bus (not shown). An audio processing unit 224 and an audio encoder/decoder (CODEC) 226 form a corresponding audio processing pipeline for high fidelity and stereo audio data processing. Audio data are carried between audio processing unit 224 and audio CODEC 226 via a communication link (not shown). The video and audio processing pipelines output data to an A/V port 228 for transmission to the television or other display monitor. In the illustrated implementation, video and audio processing components 220–228 are mounted on module 214.

Also implemented by module 214 are a USB host controller 230 and a network interface 232. USB host controller 230 is coupled to CPU 200 and memory controller 202 via a bus (e.g., the PCI bus), and serves as a host for peripheral controllers 104a–104d. Network interface 232 provides access to a network (e.g., the Internet, home network, etc.) and may be any of a wide variety of various wire or wireless interface components, including an Ethernet card, a telephone modem interface, a Bluetooth module, a cable modem interface, an xDSL interface, and the like.

Game console 102 has two dual controller support subassemblies 240a and 240b, with each subassembly supporting two game controllers 104a–104d. A front panel I/O subassembly 242 supports the functionality of power button 112 and eject button 114, as well as any light-emitting diodes (LEDs) or other indicators exposed on the outer surface of the game console. Subassemblies 240*a*, 240*b*, and 242 are coupled to module 214 via one or more cable assemblies 244.

Eight function units 140*a*–140*h* are illustrated as being connectable to four controllers 104*a*–104*d*, i.e., two function units for each controller. Each function unit 140 offers additional functionality or storage on which games, game parameters, and other data may be stored. When an MU is inserted into a controller, the MU can be accessed by memory controller 202. A system power supply module 250 provides power to the components of gaming system 100. A fan 252 cools the components and circuitry within game console 102.

To implement the present invention, a game software application 260 comprising machine instructions stored on a DVD or other storage media (or downloaded over the network) is loaded into RAM 206 and/or caches 210, 212 for execution by CPU 200. Portions of software application 260 may be loaded into RAM only when needed, or all of the software application (depending on its size) may be loaded into RAM 206. Software application 260 is described below in greater detail.

Gaming system 100 may be operated as a stand-alone system by simply connecting the system to a television or other display monitor. In this standalone mode, gaming system 100 enables one or more users to play games, watch movies, or listen to music. However, with connectivity to the Internet or other network, which is made available through network interface 232, gaming system 100 may be further coupled to another gaming system or operated as a component of a larger network gaming community, to enable online multiplayer interaction in games that are played over the Internet or other network with players using other gaming systems.

Network System

Figure 4:
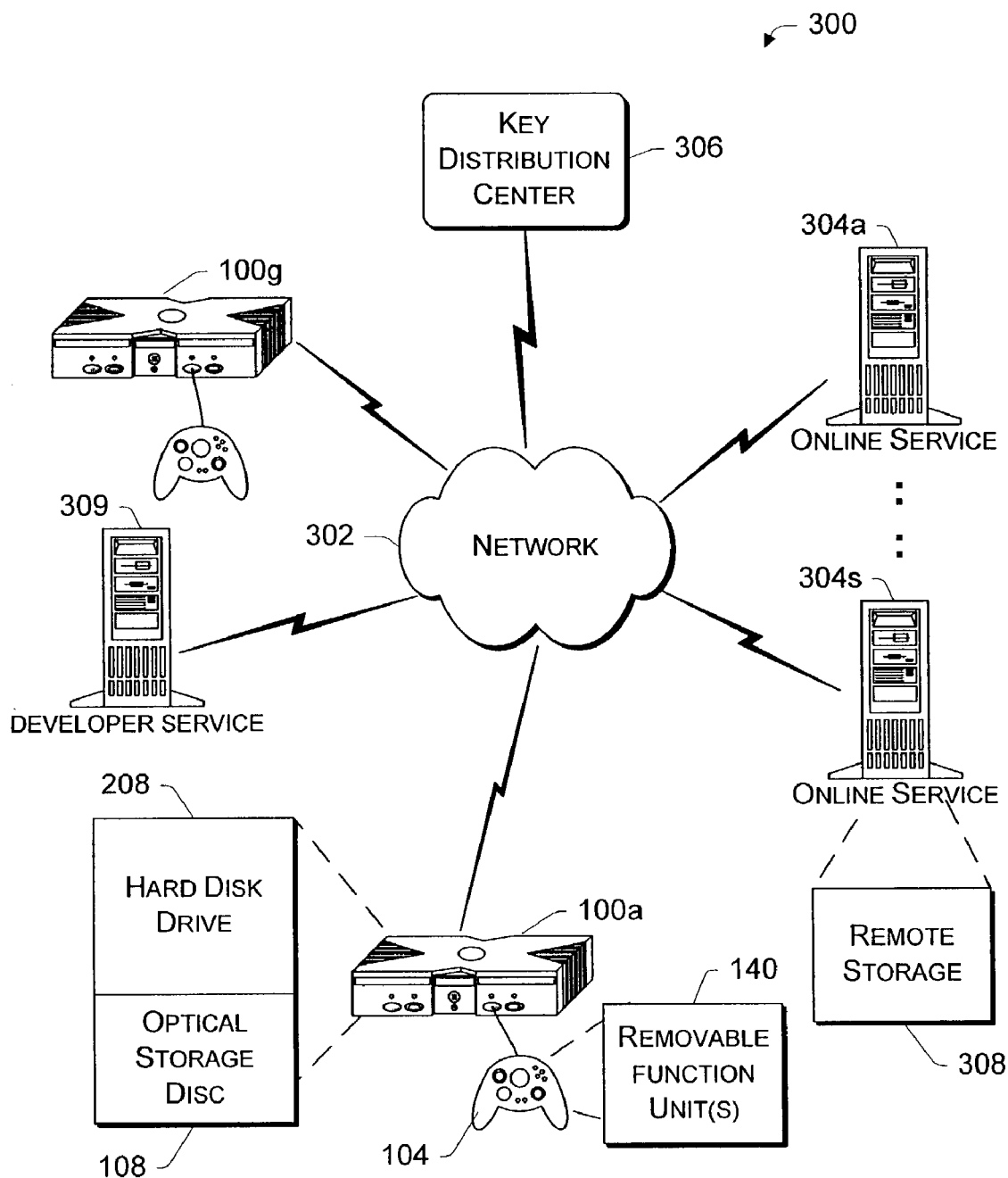
FIG. 4 is a block diagram of an exemplary network environment that interconnects multiple gaming systems.

FIG. 4 shows an exemplary network gaming environment 300 that interconnects multiple gaming systems 100*a*, . . . 100*n* via a network 302. Network 302 represents any of a wide variety of data communications networks and may include public portions (e.g., the Internet), as well as private portions (e.g., a private LAN). Network 302 may be implemented using any one or more of a wide variety of conventional communications configurations including both wired and wireless types. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304*a*, . . . 304*s* are accessible via network 302 to provide various services for the participants, such as serving and/or hosting online games, serving downloadable music or video files, hosting gaming competitions, serving streaming A/V files, enabling exchange of email or other media communications, and the like. Network gaming environment 300 may further employ a key distribution center 306 that plays a role in authenticating individual players and/or gaming systems 100 for interconnection to one another as well as to online services 304*a*, . . . 304*s*. Distribution center 306 distributes keys and service tickets to valid participants that may then be used to form game playing groups including multiple players, or to purchase services from online services 304*a*, . . . 304*s*.

Network gaming environment 300 introduces another memory source available to individual gaming systems 100, i.e., online storage. In addition to optical storage disc 108, hard disk drive 208, and MU(s), gaming system 100*a* can also access data files available at remote storage locations via network 302, as exemplified by remote storage 308 at online service 304*s*.

Network gaming environment 300 further includes a developer service 309 with which developers can produce media effects, updated media data, game code, and other services. Such services can be distributed between the online services and the gaming systems, and between other devices within, and outside of network gaming environment 300.

Exemplary Media Processing System and Audio Configuration

Figure 5:
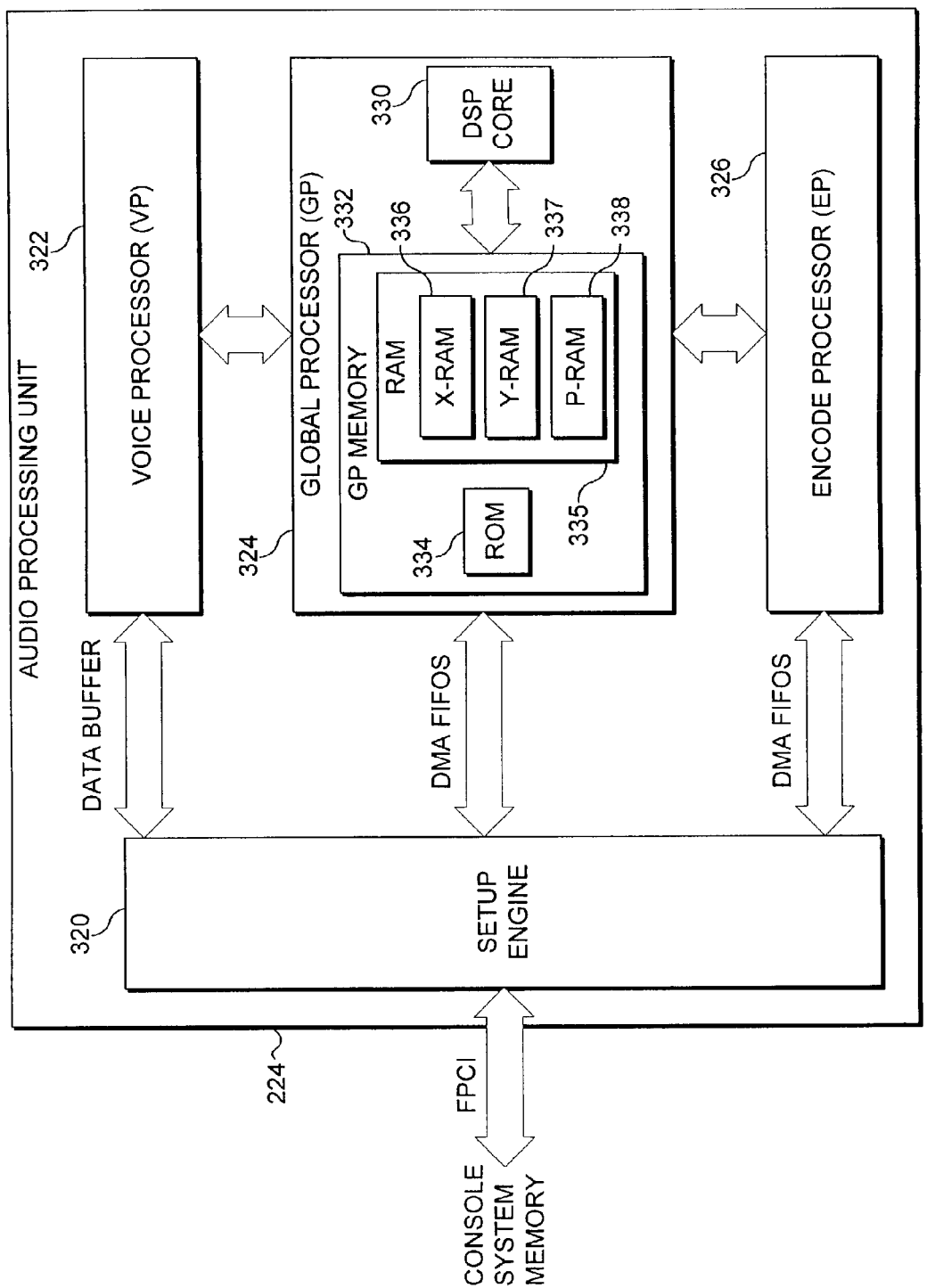
FIG. 5 is a functional block diagram preferred architecture regarding an audio processing unit of the gaming console.

A preferred embodiment of the present invention comprises an audio effects binary image builder, and a DSP execution kernel for processing an audio effects binary image on audio processing unit 224 of FIG. 3. FIG. 1 illustrates a preferred system for building an audio effects binary image. A method for building an audio effects binary image is described below with regard to FIGS. 7–12. FIG. 5 illustrates a preferred architecture of audio processing unit 224 for executing a DSP execution kernel to produce audio effects according to the audio effects binary image. The audio processing unit includes a setup engine 320 that is responsible for controlling access between console system memory and other processors within the audio processing unit. Preferably, setup engine 320 performs direct memory access (DMA) processing to gather data from console system memory and to convert the data, as necessary, to signed pulse code modulation (PCM) data, which is used by other components of the audio processing unit. Setup engine 320 also handles data addressing, including loop processing for downloadable sounds (DLS) compliance. Setup engine 320 communicates with a voice processor 322 (sometimes referred to as a VP), which is a primary PCM synthesis and sub-mixing engine.

Voice processor 322 and setup engine 320 are in communication with a global processor 324 (sometimes referred to as a GP). Global processor 324 is a DSP that performs audio effects processing and creates final linear PCM stereo or multichannel output. Global Processor 324 comprises a programmable DSP core 330 in communication with a global processor memory 332. Global processor memory 332 preferably includes a ROM 334 and a RAM 335. Further, RAM 335 preferably comprises a data RAM that includes an X-RAM 336 and a Y-RAM 337 for concurrent processing of two data items in a single instruction. Those skilled in the art will recognize that a reference to X-RAM 336 could alternatively reference Y-RAM 337 and vise versa The data RAM stores DSP program state data and other data needed to execute audio effect DSP programs. Global processor RAM 335 also preferably includes a program RAM 338 for storing audio effect programs and a DSP execution kernel. Program RAM 338 is sometimes referred to as P-RAM.

Global processor 324 and setup engine 320 communicate with an encode processor 326. Encode processor 326 provides real time Dolby digital and Dolby surround encoding. Encode processor 326 also monitors peak and root mean square (RMS) levels for individual audio streams as well as downmix for stereo output.

In general, audio data, such as audio data provided in a software game, flows from the console system memory to setup engine 320, to voice processor 322, to global processor 324, to encode processor 326, and ultimately to one or more speakers. During the flow of audio data through the gaming system, one or more audio effects may be applied to the audio data by global processor 324. Audio effects include reverberation, filtering, distortion, echo, amplitude modulation, chorus, mixing, and other conventional or custom audio effects. Such effects are implemented by software loaded from console system memory and executed by global processor 324. Global processor 324 applies the software instructions to process the audio data in voice processor 322 and provides the resultant output to encode processor 326.

Figure 6:
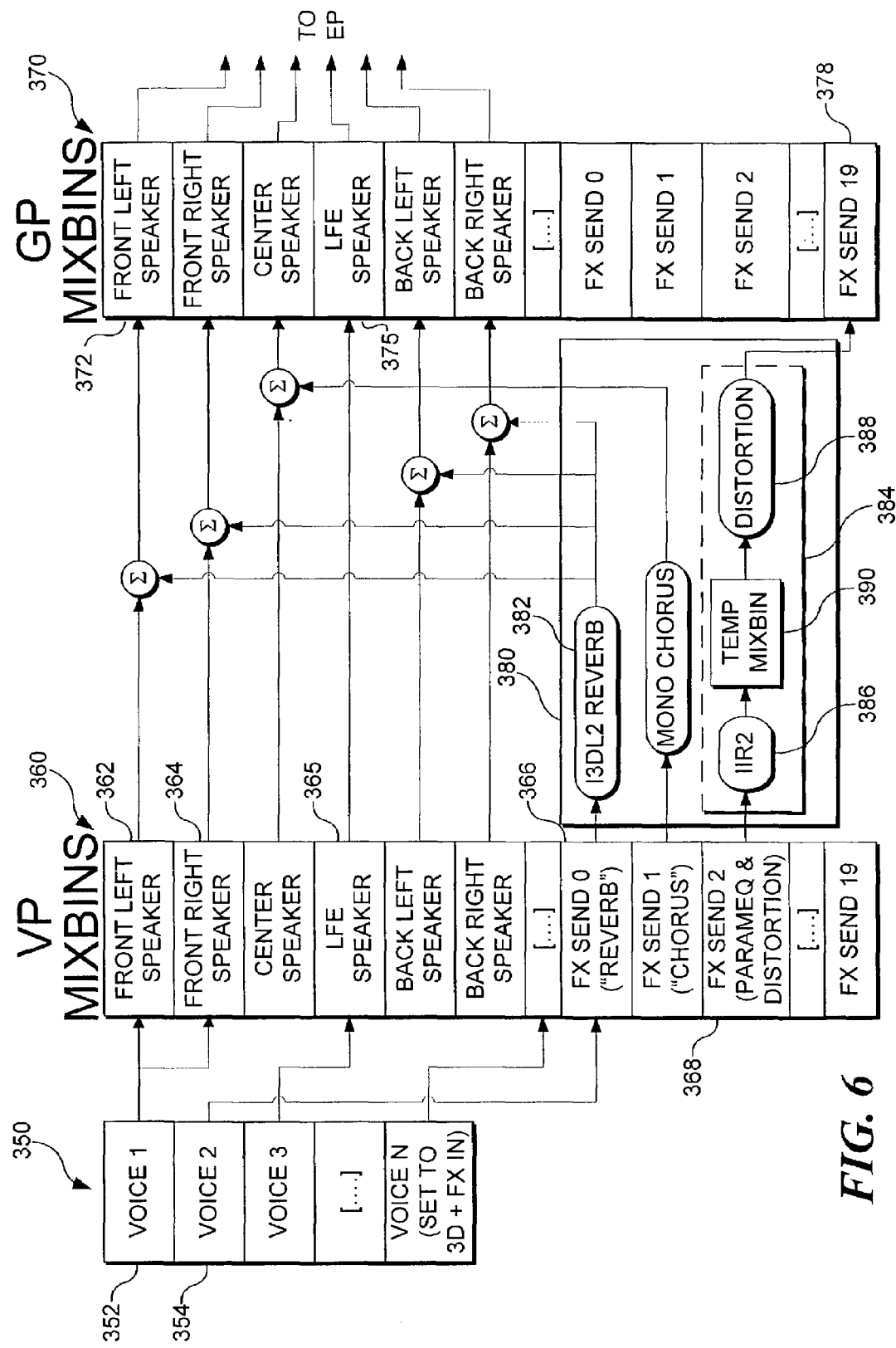
FIG. 6 is a functional block diagram showing an exemplary audio configuration for a gaming console.

FIG. 6 illustrates the logical flow described above in the form of a sample audio configuration for a computer game. Audio data sources 350, sometimes referred to as voices, are selectively routed to logical voice processor mixbins 360. For example, a game developer may choose to route recorded or live input audio data from voice one 352 to a front left speaker voice processor mixbin 362 and to a front right speaker voice processor mixbin 364. Similarly, audio data from a voice two 354 may be routed to an audio effect (FX) send zero voice processor mixbin 366. If the game developer does not wish to apply any audio effect to some of the audio data, the game developer may route the selected audio data directly to one of a plurality of global processor mixbins 370. For example, audio data stored in a low frequency encoding (LFE) speaker voice processor mixbin 365 may be routed directly to a corresponding LFE speaker global processor mixbin 375. Preferably, voice processor mixbins 360 and global processor mixbins 370 correspond to the same physical memory space. Thus, a direct routing simply indicates that no change is made to the audio data associated with LFE speaker voice processor mixbin 365. Alternatively, the game developer may choose to mix audio data from multiple locations. For example, audio data from front left speaker voice processor mixbin 362 may be mixed with audio data from FX send zero voice processor mixbin 366 and routed to front left speaker global processor mixbin 372. Again, voice processor mixbins 360 and global processor mixbins 370 represent the same physical memory space. Thus, mixing, or other processing, simply changes the audio data stored in a memory location associated with both sets of logical mixbins.

If the game developer wishes to apply one or more audio effects, the global processor uses audio data from selected voice processor mixbins as input to one or more audio effect programs 380, and routes the corresponding output to predefined global processor mixbins. For example, the game developer may choose to apply a reverberation program 382 to audio data associated with FX send zero voice processor mixbin 366. In this example, reverberation program 382 complies with interactive 3D audio rendering guidelines, level two (I3DL2). The sample audio configuration of FIG. 6 illustrates that the global processor executes reverberation program 382 and mixes the output with audio data from front left speaker voice processor mixbin 362. The mixed result is routed to front left speaker global processor mixbin 372. Effectively, the mixbin memory location is overwritten with the mixed audio data.

Multiple audio effects can be chained or applied in a sequence, such as the sequence illustrated by a chain 384. Chain 384 comprises an infinite impulse response, second order (IIR2) filter program 386 and a distortion program 388. IIR2 filter program 386 is applied to audio data associated with FX send two voice processor mixbin 368. Because there are multiple audio effects applied in chain 384, a temporary mixbin 390 is used to temporarily store intermediate output. Preferably, temporary mixbin 390 is associated with a different physical memory space than the memory space associated with voice processor mixbins 360 and global voice processor mixbins 370. The intermediate output stored in temporary mixbin 390 is then used as input to distortion program 388. The output of distortion program 388 is also the output of the entire chain 384 and is routed to a global processor mixbin, such as one of FX send 19 global processor mixbins 378.

Overall Process

Figure 7:
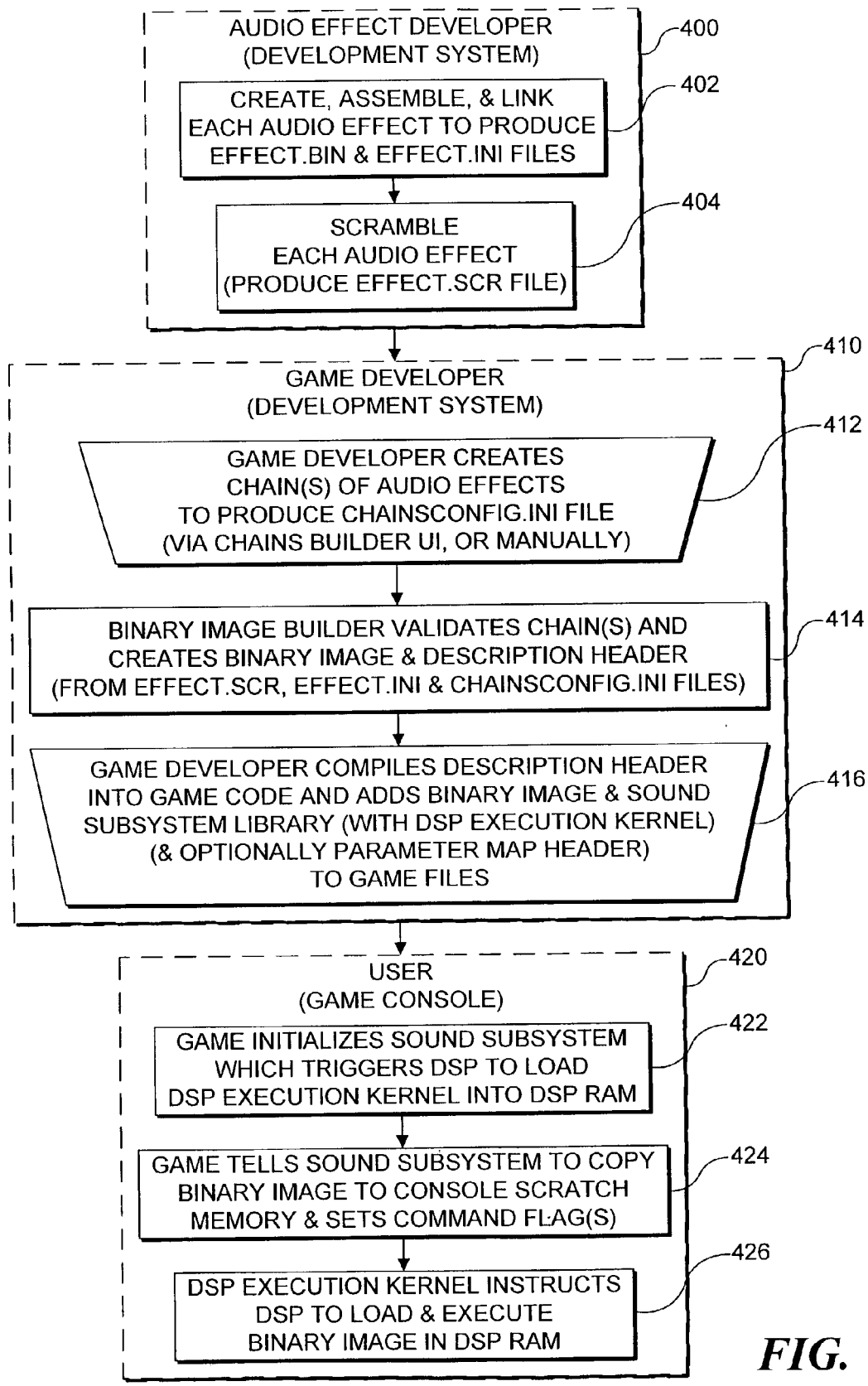
FIG. 7 is a flow diagram illustrating overall logic for developing audio effect programs, building an audio effects binary image of the audio effect programs, and executing the audio effect programs with a DSP execution kernel.

FIG. 7 is a flow diagram illustrating overall logic for developing audio effect programs, building an audio effects binary image of the audio effect programs, and executing the audio effect programs with a DSP execution kernel. In general, an audio effect developer creates one or more audio effect programs at a primary step 400. At a second primary step 410, a game developer may create chains of audio effects or otherwise develop an audio configuration for a game. Finally, at a third primary step 420, a user invokes a DSP execution kernel to load and execute the audio effect programs in connection with executing a computer game.

In more detail, an audio effect developer may utilize a development system, such as that shown in FIG. 1, to create, assemble, and link one or more individual audio effect programs, at a step 402. Preferably, the audio effect developer writes the audio effect programs in an assembly language suitable for creating machine instructions to control operation of a DSP. The audio effect developer then assembles the audio effect programs with an appropriate DSP assembler, such as a widely available Motorola Corp. DSP assembler program. The assembler preferably produces an individual binary file for each audio effect program. Also for each audio effect program, the assembler preferably produces a memory layout header file, independent of any other audio effect program. In addition to the assembled binary and header files, this embodiment of the invention requires the audio effect developer to create a small initialization file that specifies certain DSP resource requirements, some audio effect parameter information, some I/O information, and simple settings to be used by a binary image builder. A sample assembly language program and a sample initialization file are provided in Appendix A in regard to an amplitude modulation audio effect.

At a step 404, the audio effect developer scrambles the binary code of each individual audio effect to produce a scrambled binary file. A variety of well known encoding and/or encryption techniques may be used to secure each binary file, including public-private key encryption. Scrambling each individual audio effect provides some protection against copying and preparation of derivative works for the audio effect developer, who may be independent of a game developer that wishes to use one or more proprietary audio effects in a computer game or other application.

At a step 412, the game developer creates a configuration of audio effects, such as the configuration described above with regard to audio effect programs 380 in FIG. 6. Preferably, the audio effects configuration specifies one or more chains of audio effects, wherein each chain specifies one or more audio effects to be applied. Correspondingly, the audio effects configuration is sometimes referred to herein as a "chains configuration." The chains configuration is preferably implemented as a separate initialization file, which identifies the audio effects and I/O routing for each chain. The game developer may manually write the chains configuration file or employ an appropriate graphics user interface, such as a DSP chains builder interface described below with regard to FIGS. 8 and 9. A sample chains configuration file is provided in Appendix B.

At a step 414, the game developer invokes an audio effects binary image builder (different from the DSP chains builder user interface mentioned above). The binary image builder validates the chains configuration and creates a binary image of all of the audio effect programs and initialization data, as defined by the chains configuration. The resulting binary image comprises all of the audio effect programs scrambled binary code and data, arranged in execution order of the chains configuration and stored in a form that replicates the global processor RAM blocks. Effectively, the binary image predefines DSP RAM for efficient sequential execution of the audio effect programs by the DSP core of the global processor. By predefining the memory layout for sequential execution, interrupt handling, memory management, and other overhead is minimized. With overhead minimized, an efficient DSP execution kernel can be used.

To assist in memory layout, the audio effects binary image builder also creates a description header file, which describes the memory mapping of the resulting binary image. The description header is used in a manner similar to a standard C-file header. Further details regarding the audio effects binary image builder and its outputs are described below with regard to FIGS. 10–12. A sample description header file is also included in Appendix B.

At a step 416, the game developer compiles the description header into the overall game code and adds the binary image to the overall set of game files. The game developer also adds a sound subsystem library that includes the efficient DSP execution kernel. The game developer may also optionally add a different header file that maps individual parameters of the audio effect programs to DSP RAM, so that the game may change the audio effect parameter values in real-time during execution of the game and audio effect programs. By predefining this parameter map, the game can control audio effect parameter values without interrupt handling. Instead, the game simply pokes a new parameter value to a predefined location in DSP RAM holding the parameter value. The DSP then uses the new parameter value the next time that the DSP reads the predefined DSP RAM location. A sample parameter map header is provided as Appendix C.

Once a user receives a complete set of game files and initiates a game on a game console, the game software initializes the sound subsystem, at a step 422. The game sound subsystem triggers the DSP core of the global processor to copy the DSP execution kernel from the sound subsystem library into the DSP RAM and begin running the DSP execution kernel. At a step 424, the game software further instructs the sound subsystem to copy the binary image from the game files to a scratch memory space of the game console memory. The scratch memory space is a predefined area of console system memory that is accessible to the DSP. The sound subsystem also sets a number of command flags that the DSP execution kernel regularly polls. When the DSP execution kernel detects the set command flags, the DSP execution kernel instructs the DSP core, at a step 426, to load the binary image from the console scratch memory into the RAM of the global processor. Finally, the DSP execution kernel begins executing the audio effects programs of the binary image.

Exemplary Audio Effects DSP Chains Builder and Binary Image Builder

Figure 8:
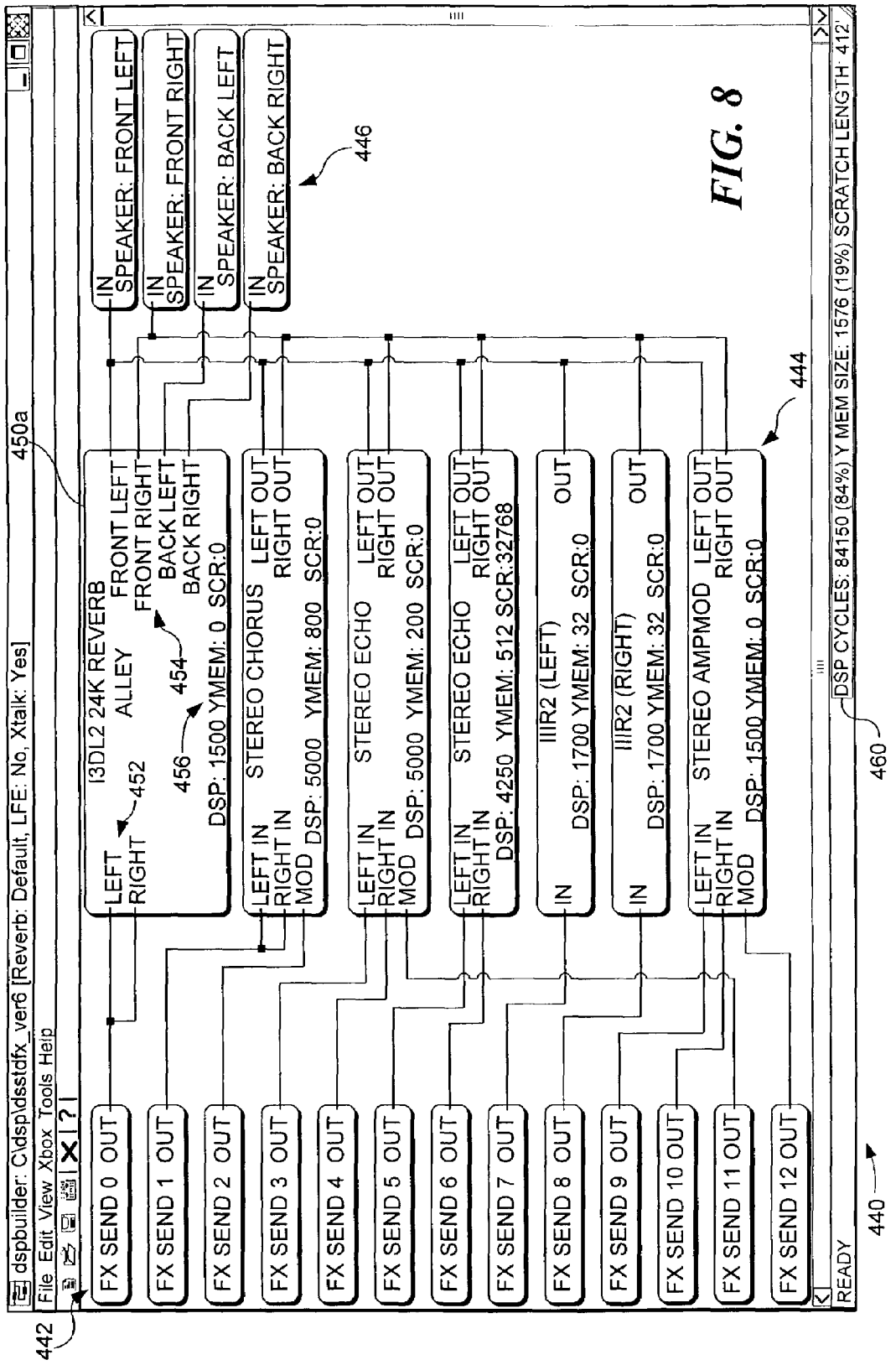
FIG. 8 is a screen print illustrating a builder user interface for creating and editing a chained configuration of audio effects programs.

FIG. 8 is a screen print illustrating a DSP chains builder user interface that a game developer may use to create and edit a configuration of audio effects programs. For commercial simplicity, the DSP chains builder user interface is sometimes referred to as DSPBuilder 440. Preferably, the game developer uses traditional drag and drop techniques to insert, manipulate, and connect graphical representations of voice processor mixbins 442, audio effect programs 444, and global processor mixbins 446. To assist in development, DSPBuilder 440 preferably provides details about individual audio effect programs and the overall configuration of audio effect programs. For example, an I3DL2 24K reverb program 450a is depicted with its specific inputs 452 and specific outputs 454. Additional details include required resources 456, such as a number of DSP cycles, the size of DSP RAM, and the length of scratch space in memory. From the individual required resources, DSPBuilder 440 also provides a total 460 of required resources for the entire configuration of audio effects.

Figure 9:
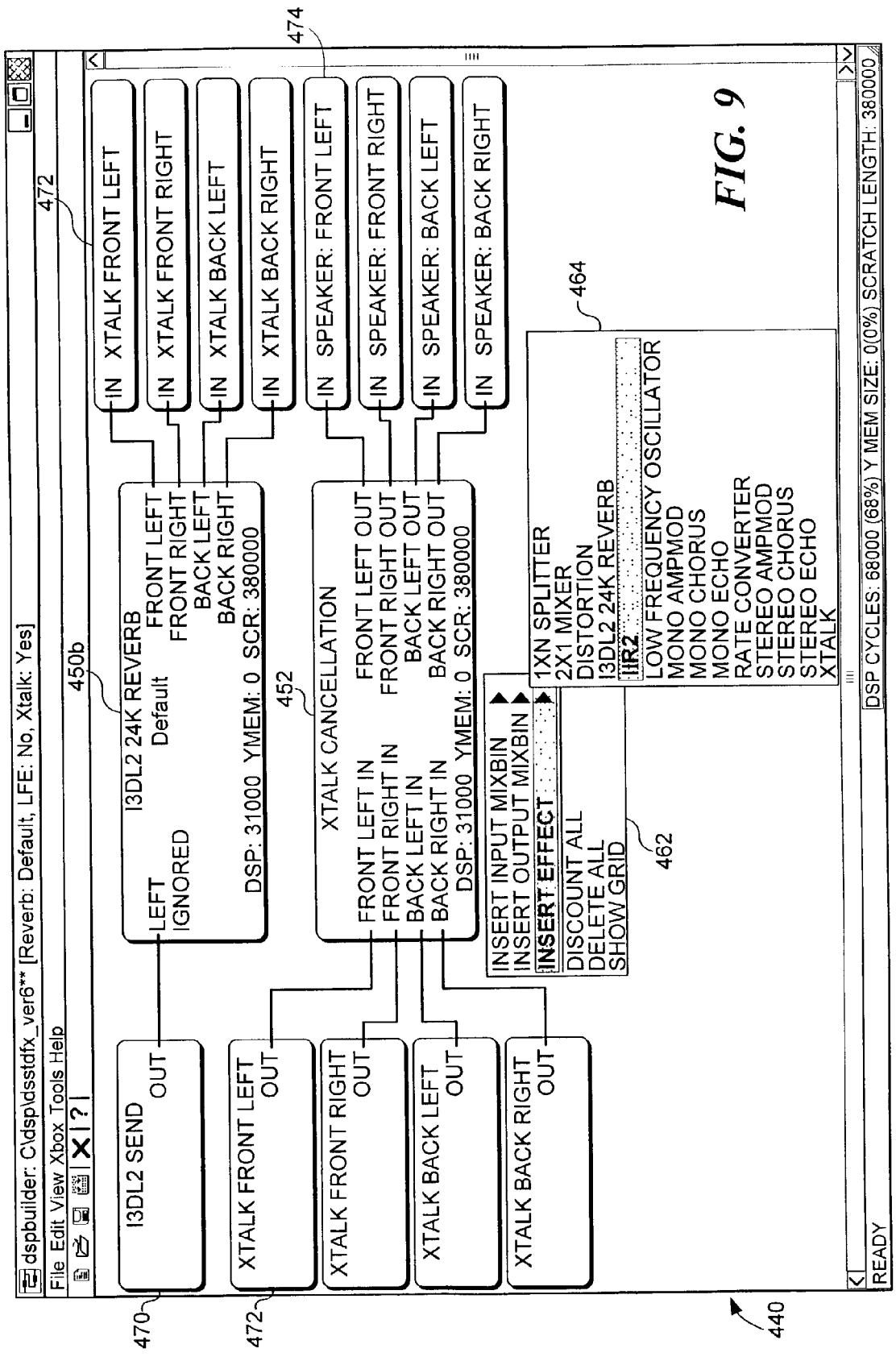
FIG. 9 is another screen print of the builder user interface illustrating multiple effect programs in a chain.

FIG. 9 is another screen print of DSPBuilder 440 illustrating multiple effect programs in a chain. Audio data originates from an I3DL2 24K send mixbin 470 and is routed to an I3DL2 24K reverb program 450b. A front left output of reverb program 450b is routed to a crosstalk front left mixbin 472. In this case, crosstalk front left mixbin 472 acts as a temporary mixbin. As shown at the left side of FIG. 9, crosstalk front left mixbin 472 is routed to a crosstalk cancellation program 452. A front left output of crosstalk cancellation program 452 is routed to a front left speaker mixbin 474.

Other audio effect programs may be inserted into the chain in a similar manner with conventional menu functions. For example, clicking a right mouse button may cause DSPBuilder 440 to display a list of editing functions 462, and an additional list of audio effects 464. When satisfied with the configuration of audio effects, the game developer preferably invokes another function of DSPBuilder 440 to generate a chains configuration initialization file, such as the example shown in Appendix B.

Figure 10:
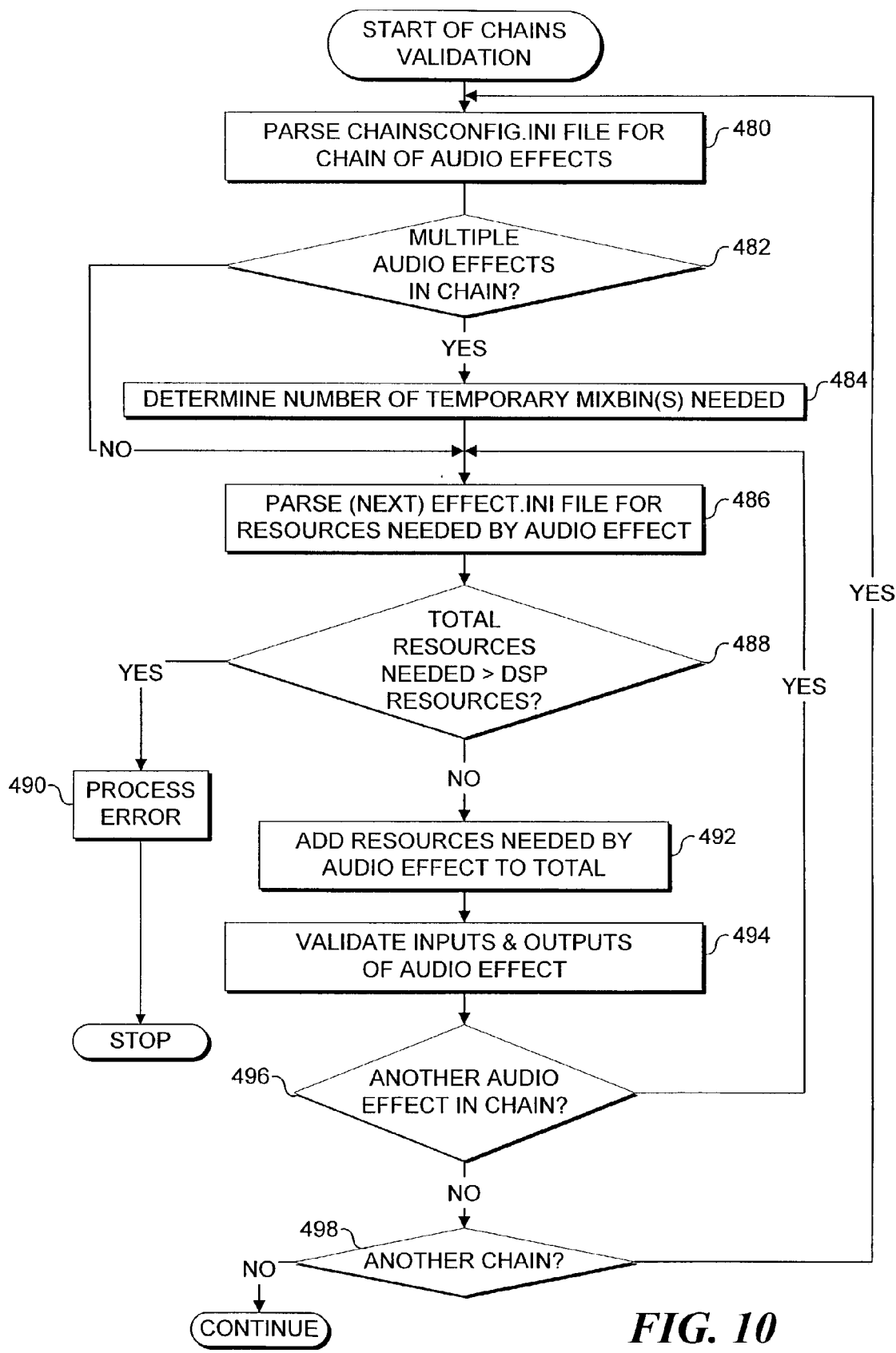
FIG. 10 is a flow diagram illustrating logic used by the audio effects binary image builder to initially validate a configuration of audio effects.

The game developer then invokes an audio effects binary image builder to generate the binary image of the audio effects configuration and to generate the corresponding description header. FIG. 10 is a flow diagram illustrating logic used by the audio effects binary image builder to first validate the configuration of audio effects. At a step 480, the image builder parses the chains configuration initialization file for a chain of audio effects. Recall that a chain may comprise a single audio effect. At a decision step 482, the binary image builder determines whether multiple audio effects are defined in the current chain. If multiple effects are defined in the current chain, the binary image builder determines, at a step 484, a number of temporary mixbins required for the inputs and/or outputs of the audio effects in the current chain.

After the number of temporary mixbins is determined, or if no temporary mixbins are required for the current chain, the binary image builder accesses an audio effect initialization file (e.g., effect.ini). The audio effect initialization files for each audio effect in all of the chains are identified in the chains configuration initialization file. At a step 486, the binary image builder parses the current audio effect initialization file for resources required by the audio effect, as defined by the audio effect developer when creating the audio effect initialization file. For example, the binary image builder searches for the number of DSP cycles required to execute the audio effect, the number of inputs to the audio effect, the number of outputs from the audio effect, the amount of scratch space required in memory, the number of parameters for the audio effect, and other resources required by the audio effect. At a decision step 488, the binary image builder determines whether a running total for each of the required resources exceeds the resources available from the DSP. If one of the running totals exceeds the corresponding available resources of the DSP, the binary image builder processes an error at a step 490. The game developer must then modify the configuration of audio effects to bring the overall configuration of audio effects within the resource limitations of the DSP.

If the current running totals of required resources do not exceed the resource limitations of the DSP, the binary image builder adds the resources required by the current audio effect to the corresponding running totals, at a step 492. Those skilled in the art will recognize that an alternative approach is to subtract the resources required by the current audio effect from the associated total resources available for the DSP. In that approach, decision step 488 would instead determine whether a running total of available resources is less than zero. In any case, at a step 494, the binary image builder validates inputs and outputs of the current audio effect. Validation includes ensuring that inputs to the audio effect are connected to a mixbin or other source of audio data if the audio effect requires such input. Similarly, the binary image builder ensures that outputs from the audio effect are connected to a temporary or permanent mixbin. Those skilled in the art will recognize that a variety of other validations may be performed. If the inputs and outputs of the current audio effect cannot be successfully validated, the binary image builder processes an error for the game developer to correct.

After successful validation of the current audio effect is complete, the binary image builder determines, at a decision step 496, whether another audio effect exists in the current chain. If another audio effect exists in the current chain, control returns to step 486 to parse a next audio effect initialization file and perform the validations described above. Once all of the audio effects in the current chain have been validated, the binary image builder determines, at a decision step 498, whether another chain of audio effects exists in the audio configuration (i.e., as indicated in the chains configuration initialization file). If another chain exists, control returns to step 480 to obtain the needed information from the chains configuration initialization file and validate the audio effects of the next chain as described above.

Figure 11:
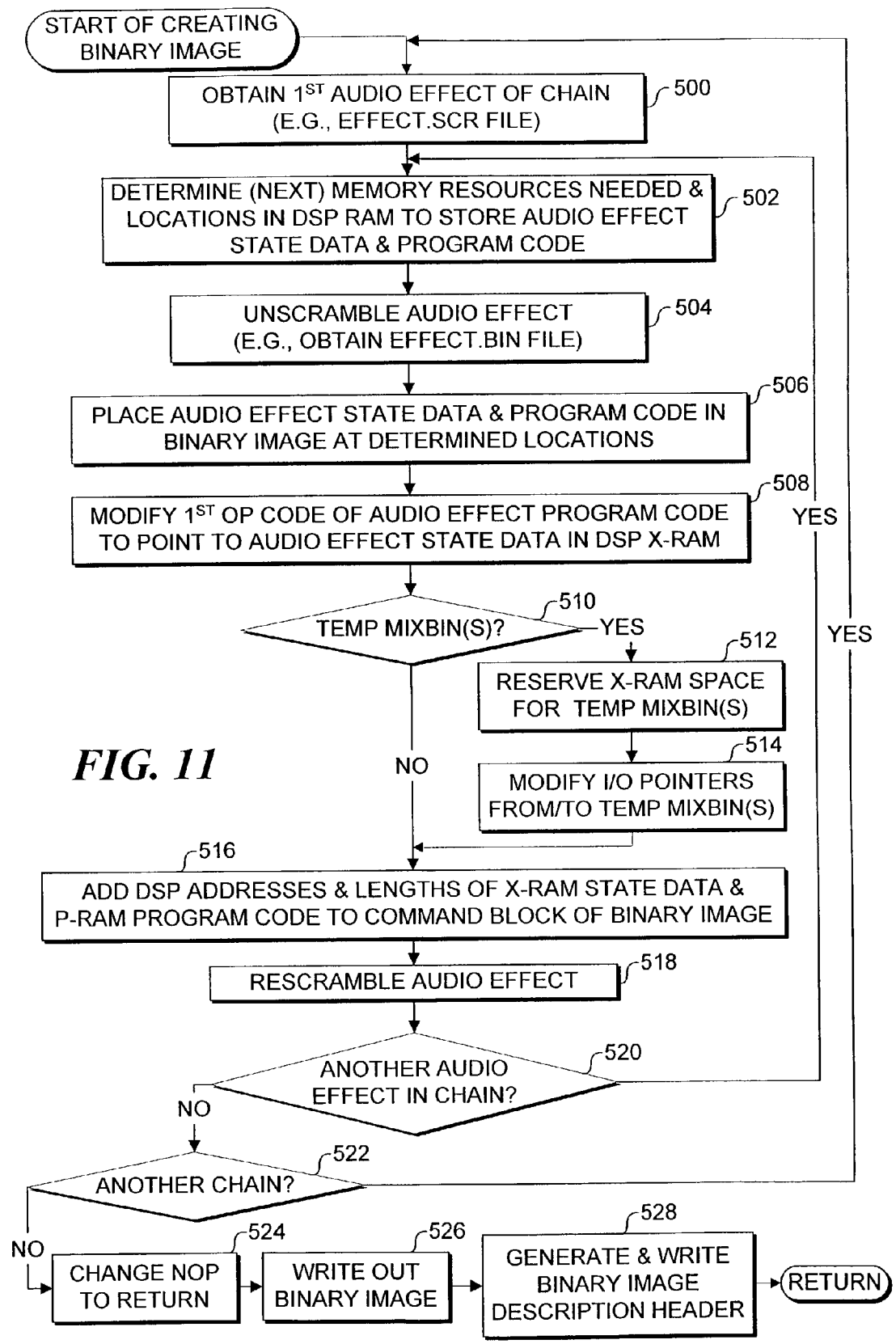
FIG. 11 is a flow diagram illustrating logic used by the audio effects binary image builder to generate a binary image.

Once the configuration of audio effects has been validated, the binary image builder generates the binary image according to logic illustrated in FIG. 11. Specifically, at a step 500, the binary image builder obtains the scrambled binary file of a first audio effect in a chain (e.g., effect.scr). Based on information from the corresponding audio effect initialization file (e.g., effect.ini) and the chains configuration initialization file (e.g., chainsconfig.ini), the binary image builder determines, at a step 502, the memory resources required by the audio effect. The binary image builder also determines a sequential location in DSP RAM to store state data and binary program code for the current audio effect. Effectively, the binary image builder determines a pointer offset from a predefined location in DSP RAM for the audio effect state data and another pointer offset from the state data for the binary machine code of the audio effect program. At a step 504, the binary image builder unscrambles the scrambled binary machine code of the audio effect. With the machine code unscrambled, the binary image builder will later be able to modify pointer values.

The binary image builder then places the audio effect state data into a binary image held in memory of the game developer's system, at a step 506. The state data are placed at a location of the binary image that is associated with the location determined at step 502 for the state data in DSP RAM. Specifically, the state data location in the binary image corresponds to a location in DSP X-RAM. Similarly, the binary image builder places the binary machine code of the audio effect program into a location of the binary image that corresponds to a location of DSP P-RAM, which was also determined at step 502. Because the binary image replicates storage locations of the DSP RAM, the binary image provides a mapping from a scratch space of console system memory to DSP RAM. This mapping sequentially packs the state data of each audio effect into the DSP X-RAM, and packs the binary machine code of each audio effect program into the DSP P-RAM. By consolidating all of the program machine code together and all of the state data together, the DSP core can sequentially execute the program instructions and sequentially refer to corresponding state data. Preferably, the DSP core will simply execute each instruction in order, without any breaks between audio effect programs and without having to determine the location of each successive instruction. This sequencing, minimizes the need for DSP branching, which often requires interrupt handing and memory management overhead. Branching may occur within an audio effect as defined by its program instructions. However, no branching is required between audio effects, so the DSP execution kernel need not be involved in transferring control from one audio effect to another audio effect.

However, because the state data and the binary machine code of an audio effect program have been relocated, the binary machine code of the program must be modified to point to the new location of the state data. Thus, at a step 508, the binary image builder modifies a first op code of the current audio effect program, so that the first op code points to the new location in DSP X-RAM where the audio effect state data will be stored. To enable this modification, each audio effect program must contain a predefined instruction as the first line of the audio effect program. Specifically, the first line of each audio effect program must comprise the following move instruction.

move #>$40, r5

The binary image builder moves a new base pointer from register r5 into address 40. Those skilled in the art will recognize that the exact instruction format and register number may differ, depending on the secondary processor used and its corresponding assembly language. In this exemplary embodiment, the new base pointer points to the location in DSP X-RAM where the state data are to be stored. Preferably, the above instruction is provided in an effects entry point macro that is defined in a utility header, which is included in each audio effect program.

Once the first op code of the audio effect program block is modified, the binary image builder determines, at a decision step 510, whether the current audio effect program was previously determined to require one or more temporary mixbins. The determination was made at step 484 of FIG. 10. If one or more temporary mixbins are required, the binary image builder reserves a portion of DSP X-RAM, at a step 512 of FIG. 11. For each temporary mixbin required, the binary image builder reserves a predefined number of words of DSP X-RAM. At a step 514, the binary image builder then modifies the corresponding I/O pointers of the audio effect program to point to the reserved DSP X-RAM locations associated with the required temporary mixbins.

After accounting for temporary mixbins, or determining that the current audio effect program does not require any temporary mixbins, the binary image builder places the DSP X-RAM address and length of the state data (and any required temporary mixbins) in a command block of the binary image, at a step 516. Similarly, the binary image builder places the DSP P-RAM address and length of the audio effect program code in the command block in the binary image. The command block is stored at a predefined location in the binary image corresponding to a predefined location in the DSP X-RAM, so that the DSP execution kernel will always know where to find the address of each block of audio effect program code and the address of each corresponding block of state data. The information in the command block is used for coordinating data transfers between the DSP RAM and the scratch space of the console system memory.

At a step 518, the binary image builder rescrambles the current audio effect in the binary image. This rescrambling does not alter the length of the program code, and thus, does not affect the P-RAM address and length determined above. At a decision step 520, the binary image builder determines whether another audio effect exists in the current chain. If another audio effect is defined for the current chain, control returns to step 502 to process a next audio effect into the binary image. When all audio effects of the current chain have been processed, the binary image builder determines, at a decision step 522, whether another chain exists in the configuration of audio effects. If another chain is defined, control returns to step 500 to process another chain of audio effects into the binary image.

Once all chains of audio effects have been processed into the binary image, the binary image builder changes a final "no op" instruction into a "return" instruction, at a step 524. This return instruction will cause the DSP core to transfer execution control back to the DSP execution kernel after all audio effects in the program block have executed. The DSP execution kernel can then determine whether any command flags were set and reinitiate execution of the audio effects in the binary image at the next frame. To enable the binary image builder to add the return instruction, regardless of which audio effect program is last in the program block, each audio effect program must include a no op instruction as its last instruction. When an audio effect is not the last effect in the program block, the no op instruction enables the DSP core to execute the next audio effect program placed in DSP P-RAM, without returning control to the DSP execution kernel. However, as indicated above, control must be returned to the DSP execution kernel after the very last audio effect program has completed execution. Therefore, the no op instruction of the very last audio effect program is changed to a return instruction. Rather than changing the final no op instruction, those skilled in the art will recognize that a return instruction could alternatively be added after the final no op instruction.

At a step 526, the binary image builder writes out the binary image to a file, which is then included with other game files. As discussed above, the binary image builder also generates and writes a binary image description header file, at a step 528, to be included with the game files. The description header includes public parameter values, scratch offsets, scratch lengths, and other standard header info from each audio effect initialization file. As part of these write steps, the entire binary image and/or description header may also be scrambled, encrypted, or otherwise secured as another layer of protection for the audio effects and the entire configuration of audio effects.

Figure 12:
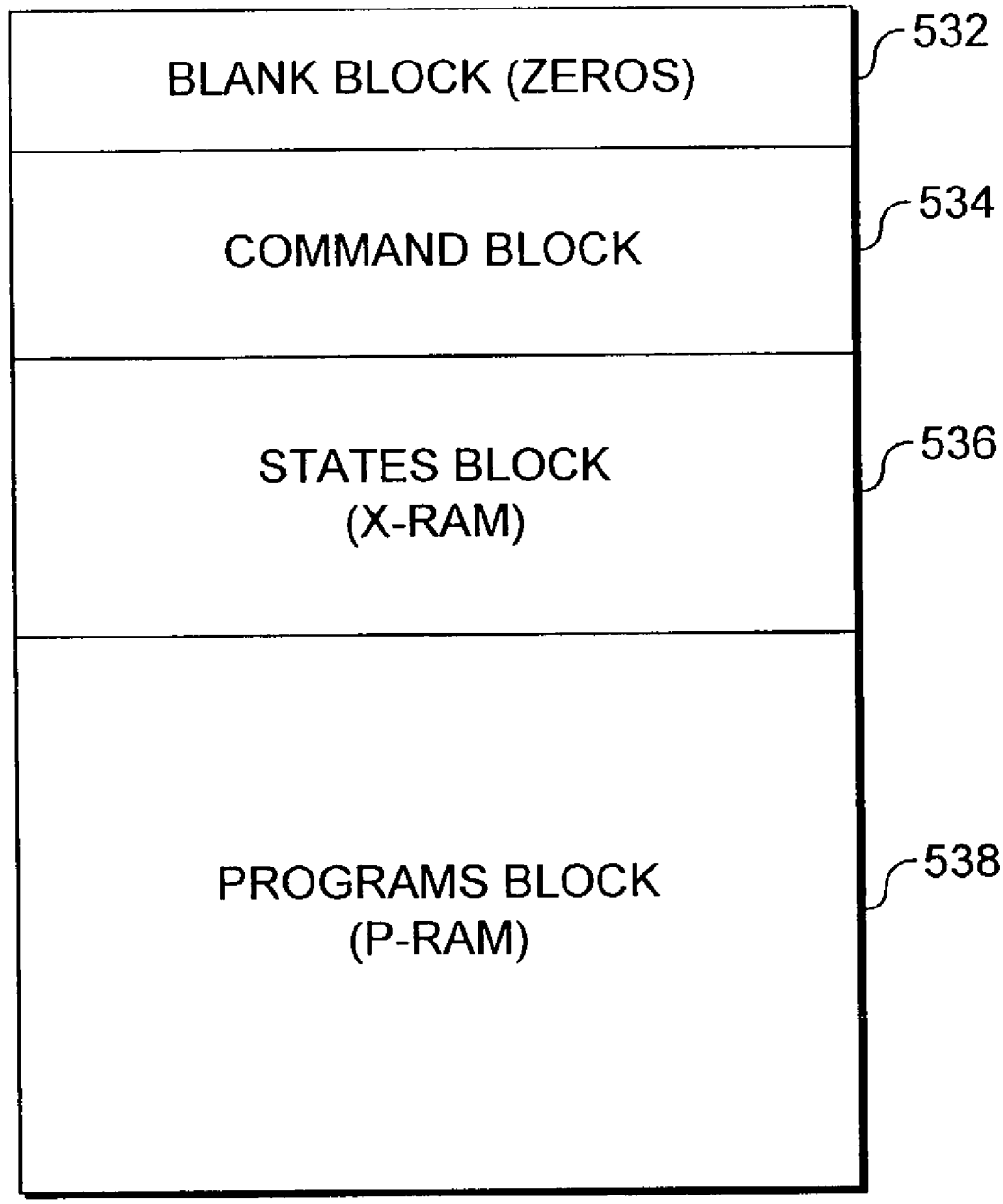
FIG. 12 is a block diagram illustrating the structure of a generated binary image.

FIG. 12 illustrates the exemplary structure of a binary image 530 resulting from the above process. The lowest memory addresses of binary image 530 comprise a blank block 532. Blank block 532 is a predefined pad area that is preferably filled with zeros. The pad area represents an area of the scratch space in console system memory that is reserved for a copy of the DSP execution kernel. Binary image 530 is loaded into the same predefined location of scratch space in the console system memory, as that used for a copy of the DSP execution kernel. The copy of the DSP execution kernel is maintained in the scratch space in the event that the DSP core encounters an execution problem and must be reinitialized. Thus, blank block 532 ensures that the copy of the DSP execution kernel is not overwritten when the binary image is loaded into the scratch space.

Following blank block 532 is a command block 534. Command block 534 begins at a predefined location of binary image 530. As indicted above, the beginning of command block 534 corresponds to a predefined location in scratch space of consol system memory. Also as indicated above, the scratch space is an area of console system memory that is reserved for exclusive use by the DSP, and replicates the DSP RAM. Specifically, the predefined location in scratch space for command block 534 corresponds to a predefined location in DSP X-RAM. Command block 534 comprises pointers and lengths for state data blocks of binary image 530 to be loaded into DSP X-RAM. Similarly, command block 534 includes pointers and lengths for audio effect programs of binary image 530 to be loaded into DSP P-RAM.

The state data of each audio effect in the configuration of audio effects are stored in a states block 536. States block 536 begins at a predefined relative offset from the beginning of command block 534. As above, the predefined relative offset of states block 536 corresponds to a predefined relative offset from the beginning of DSP X-RAM.

Directly after the end of states block 536 is a programs block 538. Programs block 538 comprises all of the machine code for the audio effect programs included in the configuration of audio effects. Because states block 536 may vary in length from one binary image to another binary image, programs block 538 does not begin at a predefined offset. Instead, programs block 538 begins at a relative offset from the beginning of command block 534, wherein that relative offset is determined during generation of the binary image so as to be located just after the end of states block 536. The relative offset of programs block 538 is mapped to a predefined offset from the beginning of DSP P-RAM. The predefined offset in DSP P-RAM falls after the area of DSP P-RAM that is used to store the DSP execution kernel. Although the binary image replicates portions of DSP RAM, it is the DSP execution kernel that actually copies and maps the binary image data and program code between the scratch space of console system memory and DSP RAM.

Exemplary DSP Execution Kernel

Figure 13:
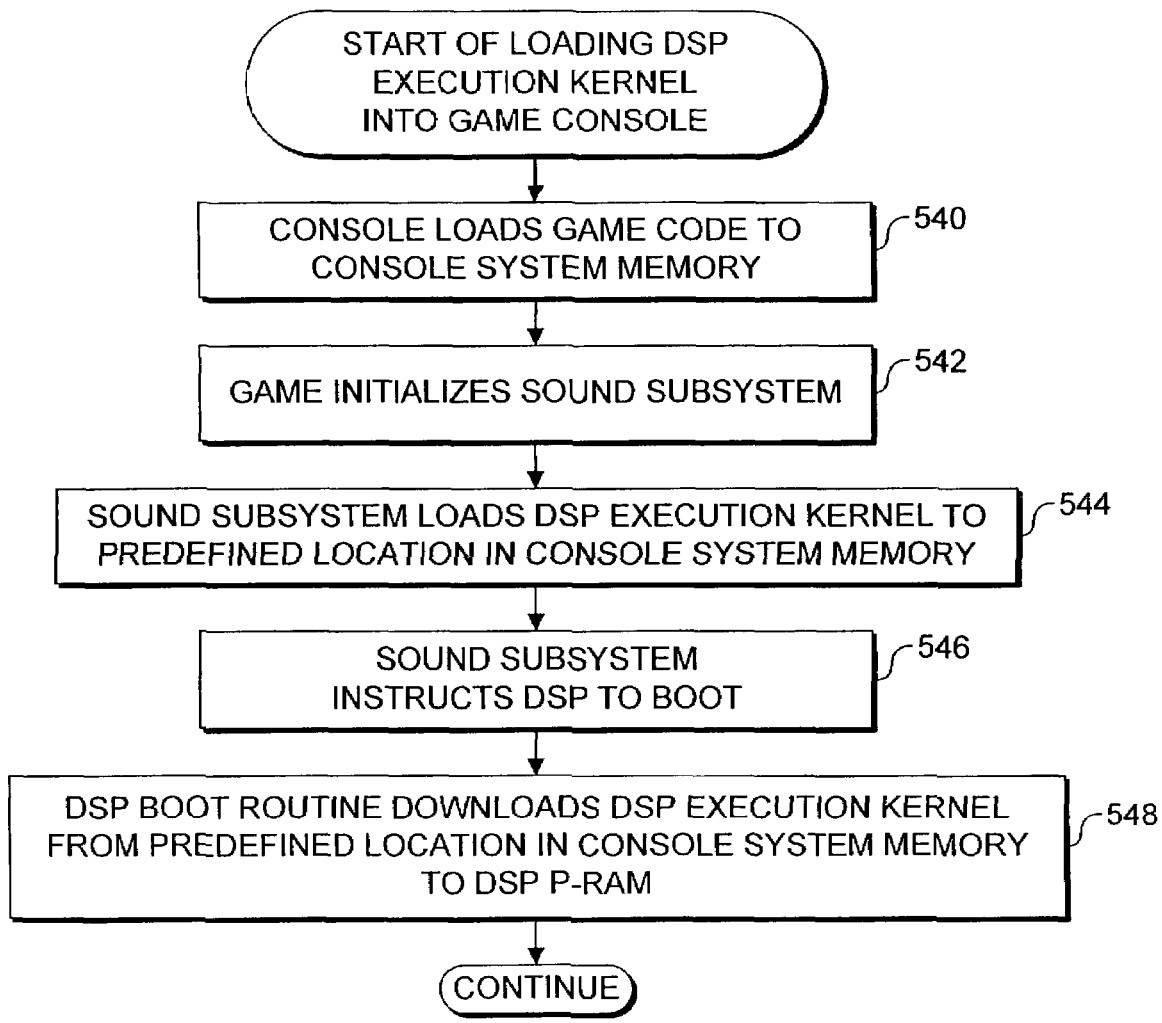
FIG. 13 is a flow diagram illustrating logic for loading the DSP execution kernel into DSP random access memory (RAM) of the game console.

The above discussion explains a preferred embodiment of the present invention that enables a developer to generate a binary image of audio effects on a development system such as a PC. The following discussion is directed to another aspect of the present invention for a preferred embodiment employed for loading and executing the audio effect programs of the binary image on a DSP in a game console under the direction of an efficient DSP execution kernel. To begin, FIG. 13 is a flow diagram illustrating logic for loading the DSP execution kernel into DSP RAM of the game console. At a step 540, the game console loads controlling game code to the console system memory. At a step 542, the game code initializes a sound subsystem. The sound subsystem obtains the DSP execution kernel from a sound subsystem library that was included with the game files. At a step 544, the sound subsystem loads the DSP execution kernel to the predefined location in console system memory referred to as the scratch space. Preferably, the sound subsystem utilizes an application programming interface (API), such as Microsoft Corporation's DirectSoundCreate API.

Once a DSP execution kernel is loaded into the scratch space of console system memory, the sound subsystem instructs the DSP to boot, at a step 546. The DSP is hard wired to execute a boot routine stored in a DSP ROM. The DSP boot routine is a basic input/output system (BIOS) that is appropriate for the particular DSP hardware. As with most BIOSs, the DSP boot routine is hard coded to obtain further instructions from a predefined location in memory. Here the DSP boot routine is hard coded to obtain further instructions from the predefined location in console system memory referred to as the scratch space. Thus, at a step 548, the DSP boot routine downloads the DSP execution kernel from the scratch space of console system memory into a predefined beginning location of DSP P-RAM.

Figure 14:
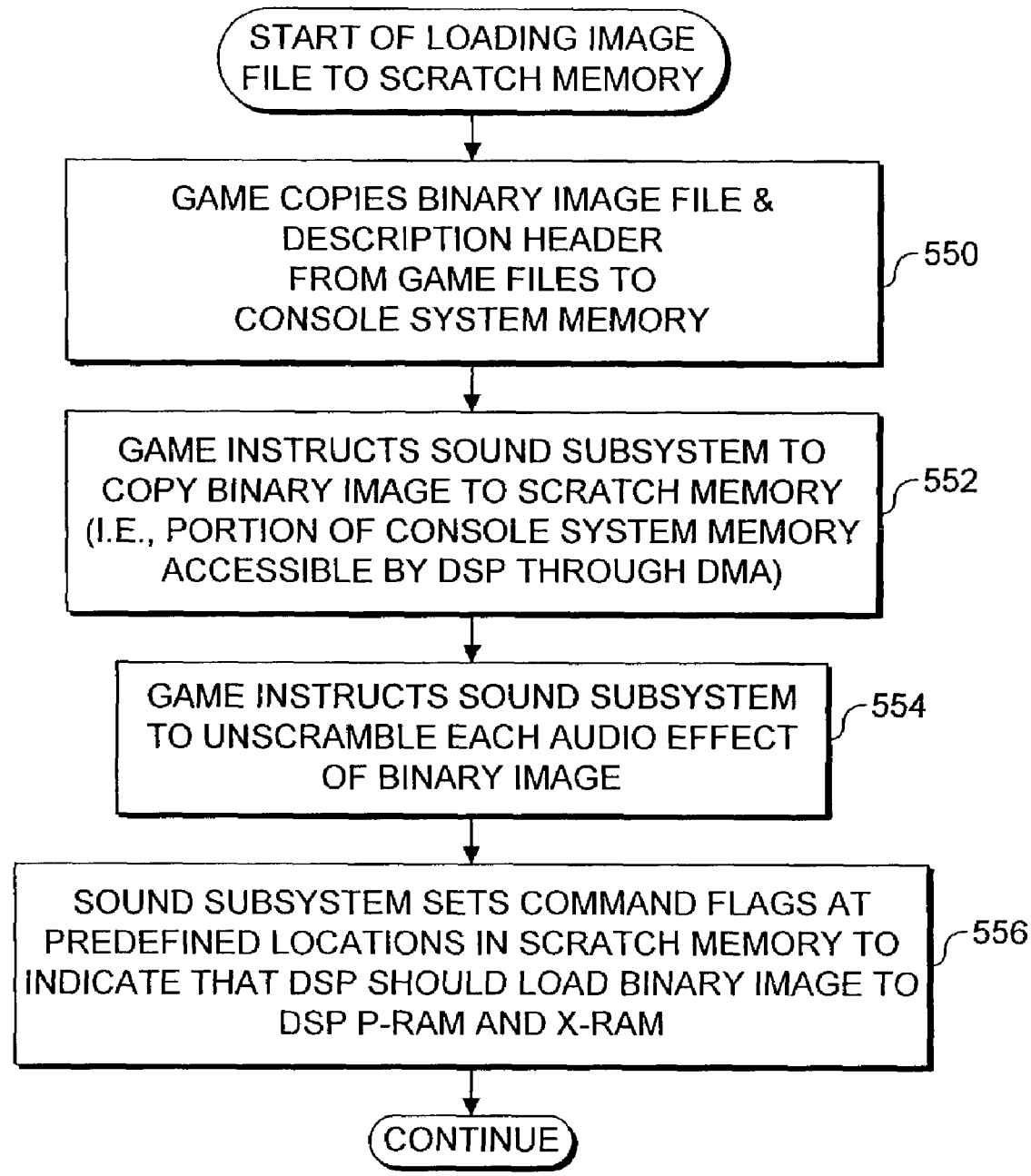
FIG. 14 is a flow diagram illustrating logic for loading the binary image file into scratch space of game console system memory.

While the DSP is downloading the DSP execution kernel, the game code may be loading the binary image file into the scratch space of console system memory. FIG. 14 is a flow diagram illustrating logic for loading the binary image file into scratch space of console system memory. At a step 550, the game obtains the binary image file and the description header from among the other game files and copies the binary image file to a convenient location of console system memory. At a step 552, the game instructs the sound subsystem to copy or move the binary image to the predefined location of console system memory referred to as the scratch space. Preferably, the sound subsystem places the binary image in the scratch space via an API such as Microsoft Corporation's DownloadEffectsImage API.

With the binary image in scratch space, the game instructs the sound subsystem to unscramble each audio effect of the binary image, at a step 554. The sound subsystem uses information stored in the binary image description header to locate the program code of each audio effect in the binary image. After unscrambling each audio effect, the sound subsystem sets a number of command flags, at a step 556. The command flags are located at predefined locations in the scratch space that the DSP execution kernel regularly polls. Setting the command flags indicates to the DSP execution kernel that the DSP execution kernel should load portions of, or all of, the binary image to DSP RAM. For example, one command flag indicates that the DSP execution kernel should load the programs block from the binary image into the DSP P-RAM. Similarly, another command flag indicates that the DSP should load the states block from the binary image to the DSP X-RAM.

Figure 15:
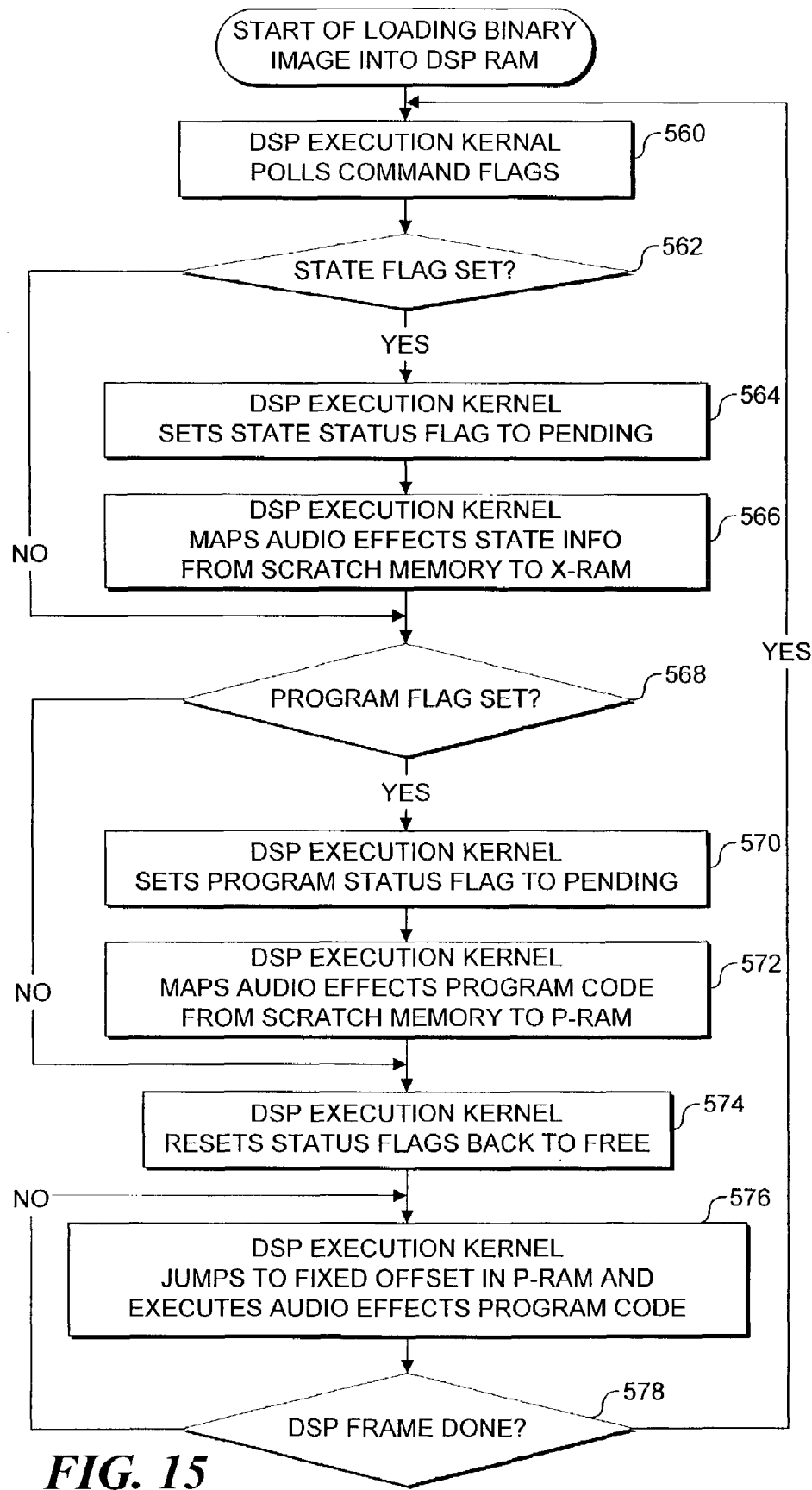
FIG. 15 is a flow diagram illustrating logic for loading portions of, or all of, the binary image into DSP RAM.

FIG. 15 is a flow diagram illustrating logic for loading portions of, or all of, the binary image into DSP RAM. At a step 560, the DSP execution kernel polls the command flags. Preferably, the DSP execution kernel polls the command flags at the beginning of each DSP execution frame. At a decision step 562, the DSP execution kernel determines whether a state flag is set. If the state flag is set, the DSP execution kernel sets a state status flag to pending, at a step 564. The status flag provides an indication to the primary processor of the game console that a portion of the scratch space is in use so that the primary processor of the game console will not overwrite the scratch space. For example, as discussed above the game may modify one or more parameters of one or more audio effects during execution of the game. To make the parameter changes take affect, the primary processor of the game console pokes new values to the scratch space of console system memory where the states block is stored. By setting the state status flag to pending, the DSP execution kernel prevents the primary processor from poking the new parameter values to the scratch space while the DSP core is downloading the states block of the binary image to the DSP RAM.

After the state status flag is set, the DSP execution kernel maps the state information of the audio effects from the scratch space to the DSP X-RAM, at a step 566. To map the information, the DSP execution kernel preferably uses a virtual address interface. The audio processing unit preferably provides an interface that maintains virtual addresses in the console system memory. The virtual addresses point to addresses in DSP RAM. By having virtual access to the DSP RAM, the game can modify audio effect parameters in real time.

Once the DSP execution kernel begins mapping audio effect state information, or if the state flag was not set, the DSP execution kernel determines, at a decision step 568, whether a program flag is set. If the program flag is set, the DSP execution kernel sets a program status flag to pending, at a step 570. In a manner similar to that described above, the DSP execution kernel then maps the audio effects program code from the scratch space to the DSP P-RAM, at a step 572.

When the desired code and state information are loaded into DSP RAM, the DSP execution kernel resets the status flags back to "free," at a step 574. In response, the primary processor of the game console resets the command flags to free, so that the DSP execution kernel does not attempt to redownload the same information. At a step 576, the DSP execution kernel jumps to the fixed location in DSP P-RAM that holds the audio effects program code and begins to execute the audio effects program. At a decision step 578, the DSP execution kernel determines whether the current DSP execution frame is complete. If the DSP execution frame is not complete, control returns to step 576 to continue executing the audio effects program. Once a DSP execution frame is complete, control returns to a step 560, at which time the DSP execution kernel again polls the command flags and repeats the above downloading process if either command flag is set.

Figure 16:
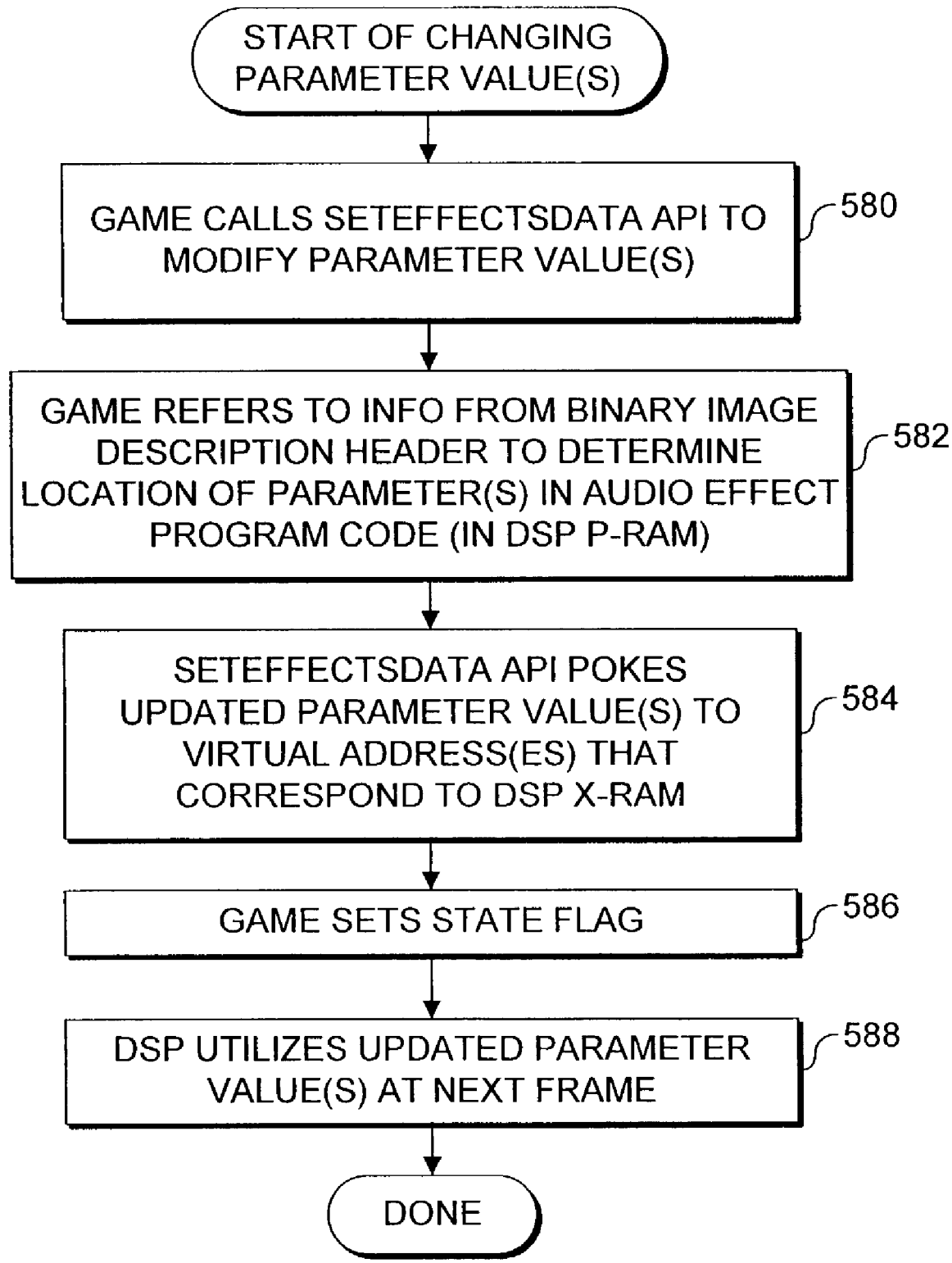
FIG. 16 is a flow diagram illustrating further detailed logic for the game to modify audio effect parameter values in real time.

FIG. 16 is a flow diagram illustrating further detailed logic for the game to modify audio effect parameter values in real time. At a step 580, the game calls an API, such as Microsoft Corporation's SetEffectsData API, to modify one or more audio effect parameter values. The game may modify parameter values in response to an event in the game, at predefined points in the game, or for other reasons. At a step 582, the game API refers to the binary image description header for the location of audio effect parameters that the game wishes to modify. Specifically, the binary image description header identifies the parameter locations in the audio effect program code that is stored in the scratch space of the console system memory. These parameter locations will be available in the binary image description header if the parameters are public parameters. For private parameters of audio effects, such as private parameters of proprietary audio effects developed by an independent audio effect developer, the game may additionally or alternatively refer to an optional parameter map header that may be provided with the game files. As indicated above, a sample parameter map header is provided in Appendix C.

Knowing the locations of the desired parameters in the program code stored in the scratch space, at a step 584, the API then writes the updated parameter values to the scratch space locations. It will be recalled that the parameter value locations in scratch space are virtual addresses of the DSP X-RAM. At a step 586, the game then sets the state flag to inform the DSP that new parameter values are available. As discussed above, and as shown by a step 588, the DSP downloads and uses the updated parameter values at the next DSP execution frame. To ensure that an audio effect uses updated parameter values, entry point code of each audio effect program preferably includes the following instructions to initialize the audio effect.

```
    move x:(rD+FX_STATE_FLAGS),x0
    brset #BIT_FX_STATE_FLAG_INITIALLZED,x0,ComputeFX
InitFX
    bset #BIT_FX_STATE_FLAG_INITIALIZED,x0
    move x0,x:(rD+FX_STATE_FLAGS)
    endm
```

The above entry point code instructs the DSP core to check whether an audio effect state flag is set. If an audio effect state flag is already set, then the audio effect is already initialized and can branch immediately to the main portion of the audio effect code, which is labeled by ComputeFX. This technique enables the audio effect to use previous parameter values, rather than rereading parameter values at each frame. However, if the audio effect is not initialized, the code instructs the DSP core to set an initialization bit, which causes the audio effect to reinitialize and use the new parameter value.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for loading a binary image that includes data and program code into a memory of a secondary processor, without using the secondary processor for determining memory locations for the data and the program code, comprising the steps of:
    (a) allocating a portion of a main memory to produce a predefined portion of the main memory for loading a secondary processor execution kernel at a predefined kernel location therein, said predefined portion of the main memory being mapped to a secondary processor memory that is accessible by the secondary processor;
    (b) causing the secondary processor to download the secondary processor execution kernel to a predefined kernel location in the secondary processor memory;
    (c) loading the binary image at a predetermined image location in the predefined portion of the main memory, wherein the binary image identifies data and program locations within the secondary processor memory at which the data and the program code are to be stored;
    (d) setting a command flag at a predefined flag location within the predefined portion of the main memory;
    (e) causing the secondary processor to poll the predefined flag location to determine whether the command flag is set; and
    (f) if the command flag is set, copying the binary image from the predefined portion of the main memory to the data and program locations of the secondary processor memory.

2. The method of claim 1, further comprising the steps of:
    (a) modifying a value of a parameter of the data, to produce a modified value;
    (b) determining a parameter location for the parameter in the predefined portion of the main memory;
    (c) placing the modified value at the location of the parameter in the predefined portion of the main memory;
    (d) setting a state flag at a predefined location within the predefined portion of the main memory;
    (e) polling the predefined location in the predefined portion of the main memory to detect whether the state flag is set; and
    (f) if the state flag is set, copying the modified value to a predefined location of the memory of the secondary processor corresponding to the parameter location determined within the predefined portion of the main memory.

3. The method of claim 1, wherein the step of causing the secondary processor to download the secondary processor execution kernel comprises the step of causing the secondary processor to initiate a boot routine that automatically downloads content of a predetermined size from the predefined kernel location of the predefined portion of the main memory, said secondary processor execution kernel being within said predetermined size and included within said content.

4. The method of claim 1, further comprising the step of decoding the binary image within the predefined portion of the main memory before copying the binary image to data and program locations in the secondary processor memory.

5. The method of claim 1, wherein the binary image comprises machine readable instructions and data for at least one media effect.

6. The method of claim 1, wherein the secondary processor comprises a digital signal processor.

7. The method of claim 1, further comprising the step of causing the secondary processor to execute the program code.

8. A system for loading a binary image that includes data and program code into a memory of a secondary processor, without using the secondary processor for determining memory locations for the data and the program code, comprising:
    (a) a primary processor;
    (b) a secondary processor;
    (c) a main memory in communication with the primary processor and the secondary processor, wherein the main memory holds machine instructions that cause the primary processor to perform the functions of:
        (i) allocating a portion of the main memory to produce a predefined portion of the main memory for loading a secondary processor execution kernel at a predefined kernel location therein, said predefined portion of the main memory being mapped to a secondary processor memory that is accessible by the secondary processor;
        (ii) loading the binary image at a predetermined image location in the predefined portion of the main memory, wherein the binary image identifies data and program locations within the secondary processor memory at which the data and the program code are to be stored; and
        (iii) setting a command flag at a predefined flag location within the predefined portion of the main memory; and
    (d) a secondary processor memory in communication with the secondary processor wherein the secondary processor memory is mapped to the predefined portion of the main memory, and wherein the secondary processor memory is loaded with machine instructions that cause the secondary processor to perform the functions of:
(i) downloading the secondary processor execution kernel from the predefined kernel location of the predefined portion of the main memory to a predefined kernel location in the secondary processor memory;
(ii) polling the predefined flag location to determine whether the command flag is set; and
(iii) if the command flag is set, copying the binary image from the predefined portion of the main memory to the data and program locations of the secondary processor memory.

9. The system of claim 8, wherein the machine instructions held by the main memory further cause the primary processor to perform the functions of:
(a) modifying a value of a parameter of the data, to produce a modified value;
(b) determining a parameter location for the parameter in the predefined portion of the main memory;
(c) placing the modified value at the location of the parameter in the predefined portion of the main memory; and
(d) setting a state flag at a predefined location within the predefined portion of the main memory.

10. The system of claim 9, wherein the machine instructions loaded into the secondary processor memory further cause the secondary processor to perform the functions of:
(a) polling the predefined location in the predefined portion of the main memory to detect whether the state flag is set; and
(b) if the state flag is set, copying the modified value to a predefined location of the memory of the secondary processor corresponding to the parameter location determined within the predefined portion of the main memory.

11. The system of claim 8, wherein the machine instructions held in the main memory further cause the primary processor to perform the function of causing the secondary processor to initiate a boot routine that automatically downloads content of a predetermined size from the predefined kernel location of the predefined portion of the main memory, said secondary processor execution kernel being within said predetermined size and included within said content.

12. The system of claim 8, wherein the machine instructions held in the main memory further cause the primary processor to perform the function of decoding the binary image within the predefined portion of the main memory before copying the binary image to data and program locations in the secondary processor memory.

13. The system of claim 8, wherein the binary image comprises machine readable instructions and data for at least one media effect.

14. The system of claim 8, wherein the secondary processor comprises a digital signal processor.

15. The system of claim 8, wherein the machine instructions loaded into the secondary processor memory further cause the secondary processor to perform the function of causing the secondary processor to execute the program code.

16. A method for updating a parameter value of a program during execution of the program by a secondary processor, comprising the steps of:
(a) determining a location in a predefined portion of a main memory at which the parameter value is stored, wherein the predefined portion of the main memory is mapped to a secondary processor memory;
(b) placing an updated parameter value at the determined location;
(c) setting a flag at a predefined flag location in the predefined portion of the main memory;
(d) causing the secondary processor to poll the predefined flag location;
(e) if the flag is set, causing the secondary processor to copy the updated parameter value from the determined location in the predefined portion of the main memory to a corresponding location in the secondary processor memory; and
(f) causing the secondary processor to use the updated parameter value at a next frame of execution by the secondary processor.

17. The method of claim 16, wherein the step of determining the location in the predefined portion of the main memory at which the parameter value is stored comprises the step of referring to a binary image description header for an offset from a data block to the location in the predefined portion of the main memory at which the parameter value is stored.

18. The method of claim 16, wherein the secondary processor comprises a digital signal processor.

19. The method of claim 16, wherein the parameter value corresponds to a media effect parameter.

20. A system for updating a parameter value of a program during execution of the program by a secondary processor, comprising:
(a) a primary processor;
(b) a secondary processor;
(c) a main memory in communication with the primary processor and the secondary processor, wherein the main memory holds machine instructions that cause the primary processor to perform the functions of:
(i) determining a location in a predefined portion of a main memory at which the parameter value is stored, wherein the predefined portion of the main memory is mapped to a secondary processor memory;
(ii) placing an updated parameter value at the determined location;
(iii) setting a flag at a predefined flag location in the predefined portion of the main memory; and
(d) a secondary processor memory in communication with the secondary processor wherein the secondary processor memory is mapped to the predefined portion of the main memory, and wherein the secondary processor memory is loaded with machine instructions that cause the secondary processor to perform the functions of:
(i) causing the secondary processor to poll the predefined flag location;
(ii) if the flag is set, causing the secondary processor to copy the updated parameter value from the determined location in the predefined portion of the main memory to a corresponding location in the secondary processor memory; and
(iii) causing the secondary processor to use the updated parameter value at a next frame of execution by the secondary processor.

21. The system of claim 20, wherein the machine instructions held in the main memory further cause the primary processor to perform the function of referring to a binary image description header for an offset from a data block to the location in the predefined portion of the main memory at which the parameter value is stored.

22. The system of claim 20, wherein the secondary processor comprises a digital signal processor.

23. The system of claim 20, wherein the parameter value corresponds to a media effect parameter.

* * * * *